(12) United States Patent
Kawai et al.

(10) Patent No.: US 11,626,635 B2
(45) Date of Patent: Apr. 11, 2023

(54) PARTITION MEMBER AND ASSEMBLED BATTERY

(71) Applicant: Mitsubishi Chemical Corporation, Chiyoda-ku (JP)

(72) Inventors: Tomohiro Kawai, Chiyoda-ku (JP); Yoko Watanabe, Chiyoda-ku (JP); Iwao Soga, Chiyoda-ku (JP)

(73) Assignee: Mitsubishi Chemical Corporation, Chiyoda-ku (JP)

( * ) Notice: Subject to any disclaimer, the term of this patent is extended or adjusted under 35 U.S.C. 154(b) by 35 days.

(21) Appl. No.: 16/572,047

(22) Filed: Sep. 16, 2019

(65) Prior Publication Data

US 2020/0058972 A1 Feb. 20, 2020

Related U.S. Application Data

(63) Continuation of application No. PCT/JP2018/010444, filed on Mar. 16, 2018.

(30) Foreign Application Priority Data

Mar. 17, 2017 (JP) .............................. JP2017-053191

(51) Int. Cl.
*H01M 10/6557* (2014.01)
*H01M 10/613* (2014.01)
(Continued)

(52) U.S. Cl.
CPC ..... *H01M 10/6557* (2015.04); *H01M 10/613* (2015.04); *H01M 10/625* (2015.04);
(Continued)

(58) Field of Classification Search
CPC ........... H01M 10/6557; H01M 10/613; H01M 10/625; H01M 10/6568; H01M 2220/20;
(Continued)

(56) References Cited

U.S. PATENT DOCUMENTS 6,082,443 A * 7/2000 Yamamoto .......... F28D 15/0233
165/104.21
2007/0292751 A1 12/2007 Cherng et al.
(Continued)

FOREIGN PATENT DOCUMENTS

JP 2004-349155 A 12/2004
JP 2005-302674 A 10/2005
(Continued)

OTHER PUBLICATIONS

Li et al. "Characteristics of Boiling Bubble Dynamics in Bead Packed Porous Structures." Proceedings of the ASME 2009 Heat Transfer Summer Conference 2009 (Year: 2009).*
(Continued)

*Primary Examiner* — Michael L Dignan
(74) *Attorney, Agent, or Firm* — Oblon, McClelland, Maier & Neustadt, L.L.P.

(57) ABSTRACT

A partition member has a thickness direction and a surface direction perpendicular to the thickness direction, and which separates single cells that make up an assembled battery in the thickness direction, or a single cell that makes up the assembled battery in the thickness direction and a member other than the single cells. The partition member includes, in the interior thereof, a fluid having a boiling point at normal pressure of 80° C. to 250° C., and a flow channel of the fluid extending along the surface direction. The fluid is held in a fluid holding part, and the fluid holding part is hermetically sealed by a packaging material.

20 Claims, 18 Drawing Sheets

(51) Int. Cl.
  *H01M 10/625* (2014.01)
  *H01M 10/6568* (2014.01)
  *H01M 50/209* (2021.01)

(52) U.S. Cl.
  CPC ...... *H01M 10/6568* (2015.04); *H01M 50/209* (2021.01); *H01M 2220/20* (2013.01)

(58) Field of Classification Search
  CPC ............. H01M 50/209; H01M 10/647; H01M 10/6552; H01M 10/6555; H01M 10/6569; H01M 10/653; H01M 50/20; Y02E 60/10
  See application file for complete search history.

(56) References Cited

U.S. PATENT DOCUMENTS

| | | |
|---|---|---|
| 2008/0131745 A1 | 6/2008 | Ikeda et al. |
| 2008/0292950 A1 | 11/2008 | Maeda et al. |
| 2010/0025009 A1* | 2/2010 | Klett ........................ F28D 15/04 165/46 |
| 2011/0206968 A1 | 8/2011 | Nishimura et al. |
| 2012/0114982 A1 | 5/2012 | Mitsuda et al. |
| 2012/0148895 A1* | 6/2012 | Fujikawa ............ H01M 10/486 429/120 |
| 2012/0237805 A1* | 9/2012 | Abels ................ H01M 10/6567 228/136 |
| 2012/0270081 A1 | 10/2012 | Horii et al. |
| 2015/0214521 A1* | 7/2015 | Hisano .................. H01M 50/20 429/99 |
| 2016/0201995 A1* | 7/2016 | Oliva Llena .......... F28D 20/026 165/10 |
| 2018/0076494 A1* | 3/2018 | Kuboki ................... F28D 15/02 |
| 2018/0269547 A1* | 9/2018 | Robert ................ H01M 10/647 |
| 2019/0221902 A1* | 7/2019 | Kuboki .................. H01G 11/76 |
| 2019/0237833 A1* | 8/2019 | Kulp ................. H01M 10/6557 |

FOREIGN PATENT DOCUMENTS

| | | |
|---|---|---|
| JP | 2008-166260 A | 7/2008 |
| JP | 2009-4362 A | 1/2009 |
| JP | 2009-176464 A | 8/2009 |
| JP | 2011-192642 A | 9/2011 |
| JP | 2012-114415 A | 6/2012 |
| JP | 2012-226995 A | 11/2012 |
| JP | 2013-131428 A | 7/2013 |
| JP | 2015-5553 A | 1/2015 |
| JP | 2016-178078 A | 10/2016 |
| JP | 2016-133966 A | 11/2016 |
| KR | 10-2012-0089633 A | 8/2012 |
| KR | 10-2012-0102344 A | 9/2012 |
| WO | WO 2012/032697 A1 | 3/2012 |
| WO | WO 2016/148225 A1 | 9/2016 |

OTHER PUBLICATIONS

Extended European Search Report dated Mar. 4, 2020 in European Patent Application No. 18767795.0, 9 pages.

English translation of the International Preliminary Report on Patentability and Written Opinion of the International Searching Authority dated Sep. 26, 2019 in PCT/JP2018/010444 filed Mar. 16, 2018, 14 pages.

International Search Report dated Apr. 17, 2018 in PCT/JP2018/010444 filed Mar. 16, 2018 (with English Translation).

Japanese Office Action dated Aug. 31, 2021 in Japanese Patent Application No. 2019-506292 (with unedited computer generated English translation), 13 pages.

Decision of Refusal issued in Japanese Patent Application No. 2019-506232 dated Feb. 22, 2022 (w/ English translation).

Combined Office Action and Search Report issued in Chinese Patent Application No. 201880018792.1 dated Mar. 9, 2022 (w/ English translation).

Chinese Office Action dated Sep. 30, 2022 in Chinese Patent Application No. 201880018792.1 (with English translation), 43 pages.

Korean Office Action issued in Korean Patent Application No. 10-2019-7027161 dated Feb. 13, 2023, (w/ English translation).

Chinese Office Action issued in Chinese Patent Application No. 201880018792.1 dated Mar. 5, 2023, (w/ English translation).

\* cited by examiner

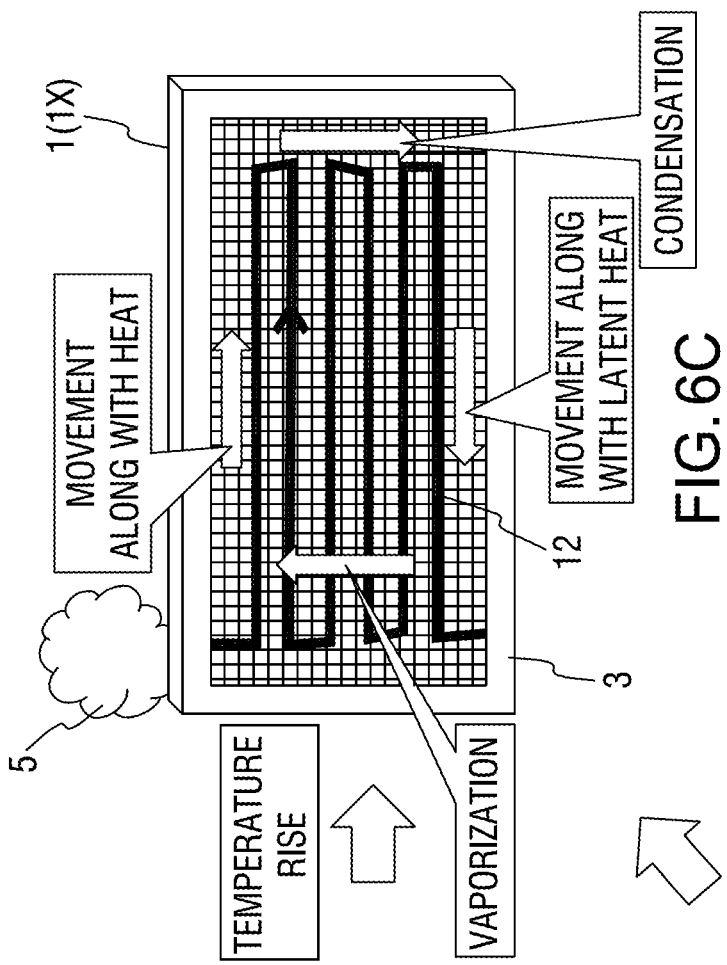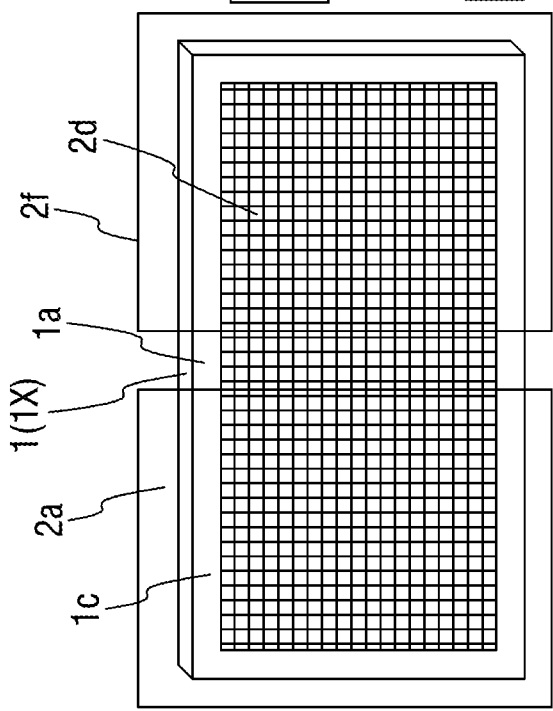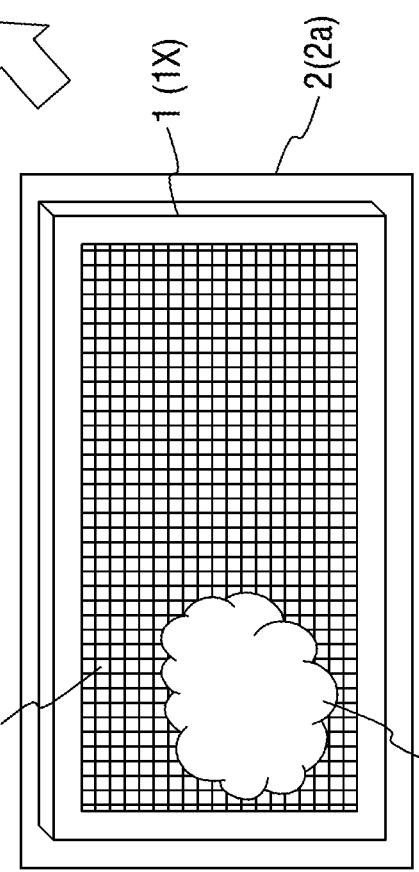

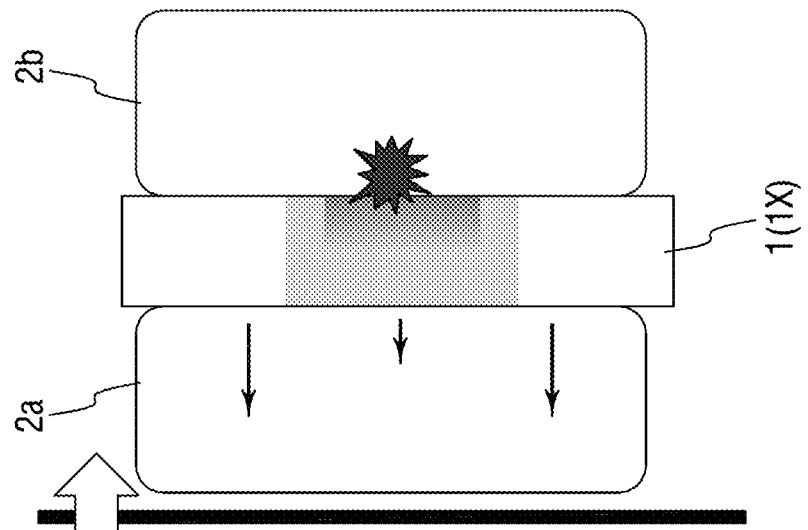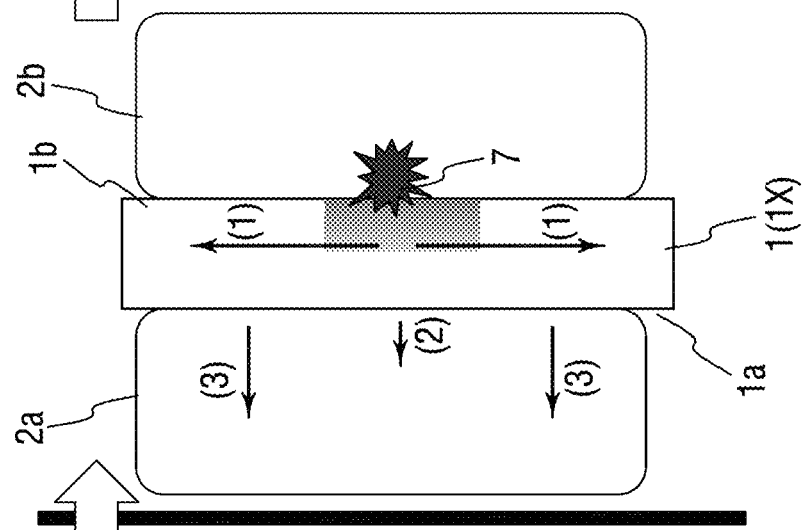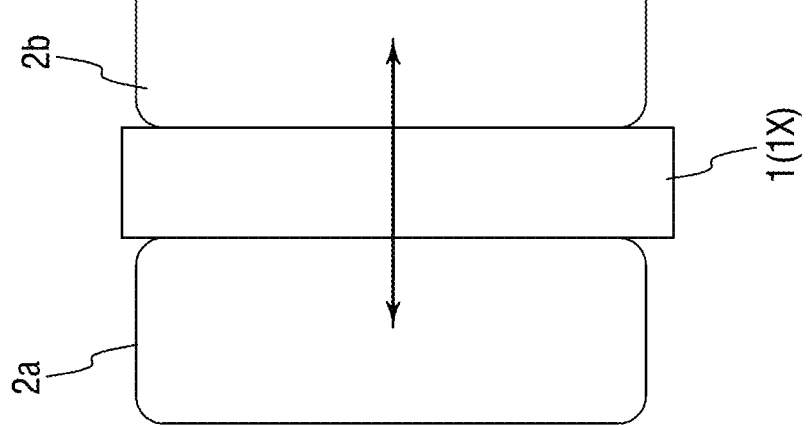

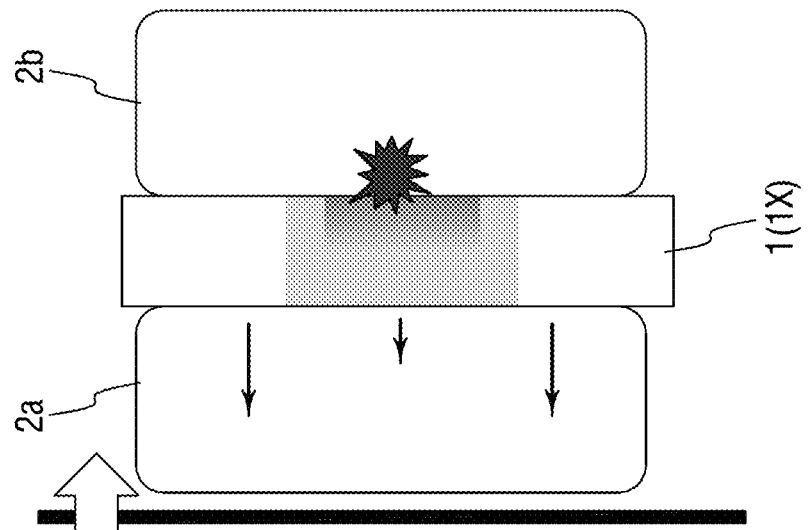
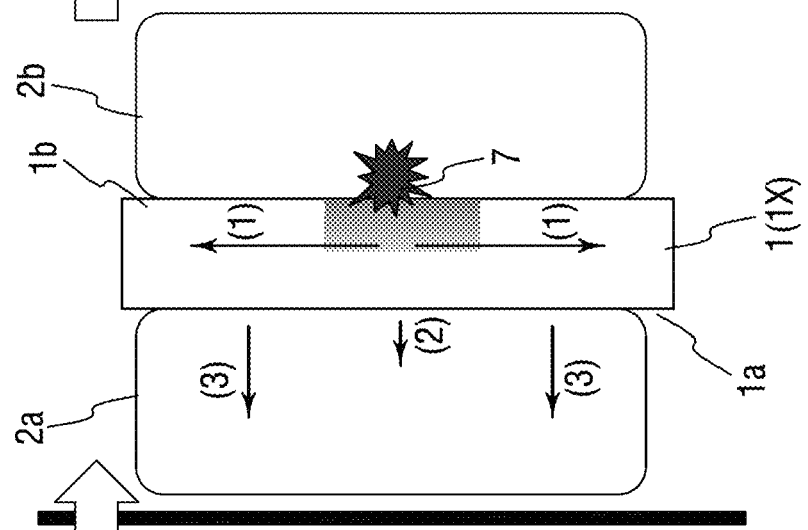
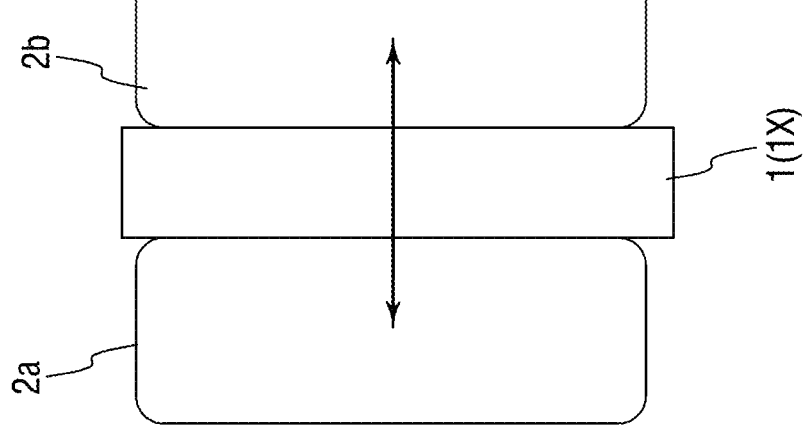

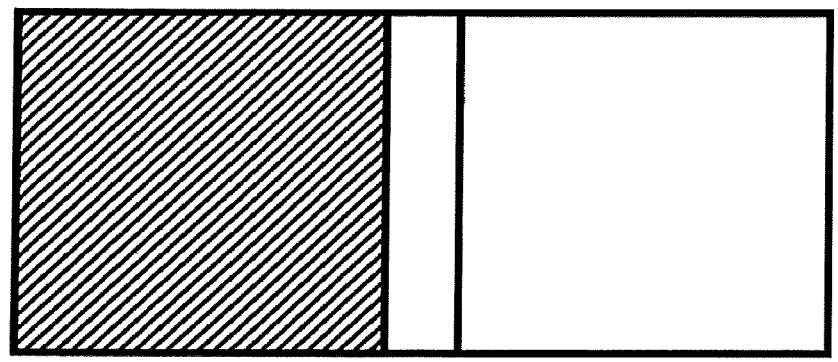
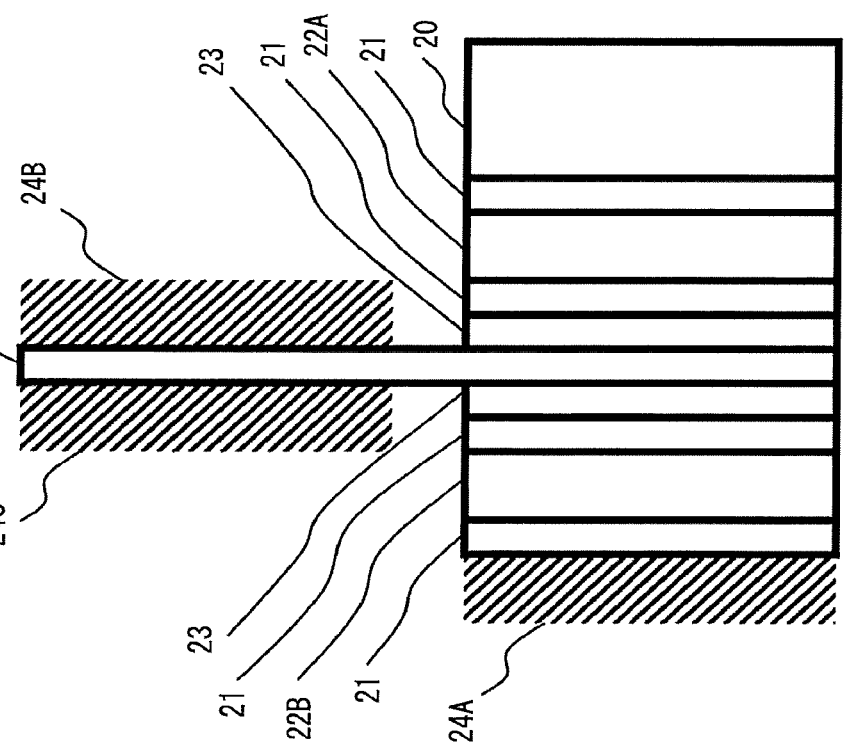

PARTITION MEMBER AND ASSEMBLED BATTERY

CROSS-REFERENCE TO RELATED APPLICATION

This application is a continuation application of International Application PCT/JP2018/010444 filed on Mar. 16, 2018 and designated the U.S., and this application is based upon and claims the benefit of priority of the prior Japanese Patent Application No. 2017-053191, filed on Mar. 17, 2017, the entire contents of which are incorporated herein by reference.

FIELD

The present invention relates to a partition member and to an assembled battery.

BACKGROUND

The use of secondary batteries as power sources for vehicles and the like has grown dramatically in recent years. Studies are being conducted on further increasing the energy density of secondary batteries, for the purpose of, for instance, increasing the degree of freedom in mounting of a secondary battery in the limited space of a vehicle or the like, and extending the cruising range that can be covered with one charging.

A tradeoff tends to arise in secondary batteries between safety and energy density, in that the higher the energy density of the secondary battery, the lower the safety of the battery tends to be. For instance, in secondary batteries mounted on electric vehicles with a cruising range of several hundred km, the surface temperature of the battery in the case of damage to the battery, for instance, due to overcharge or internal short-circuits, may exceed several hundred degrees C., and may reach about 1000° C.

Secondary batteries that are used as power sources, for instance, in vehicles or the like are generally utilized in the form of assembled batteries made up of a plurality of single cells (hereafter also referred to as "cells"). Accordingly, in a case where such a temperature region is arrived at on account of damage to one of the constituent single cells, single cells adjacent thereto may become damaged owing to the generated heat, the damage spreading thereupon in a positive-feedback fashion throughout the assembled battery. To prevent such positive-feedback damage to single cells, technologies have been proposed that involve cooling the damaged single cells or suppressing flow of heat from damaged single cells to undamaged single cells.

For instance, patent literature (PTL) 1 discloses a battery module provided with cooling units in which a coolant such as water is accommodated in a sheet-shaped bag, wherein each cooling unit has a sealing portion formed through sealing of a sheet-shaped member, and is provided with an openable portion that becomes open upon abnormal heat generation of a single cell. PTL 2 discloses a partition member having a configuration wherein a porous body impregnated with a coolant such as water is placed in a sheet-shaped bag. Since the partition member utilizes a porous body, the coolant such as water can be allowed to move towards a heat generation portion, without waste, by virtue of the capillary forces of the porous body, and the heat of vaporization of the sealed-in coolant such as water can be utilized yet more efficiently. PTL 3 discloses an assembled battery wherein a filler having extinguishing ability is fitted into the lumen of a partition member, such that the filler flows out to the exterior when the partition member becomes open on account of heat. Further, PTL 4 discloses an assembled battery system wherein a cooling body is provided between two adjacent square battery cans that are arrayed parallelly, so that the large-area side faces of the two adjacent battery cans oppose each other, and wherein the cooling body is provided with an opening and an isolating wall that form a flow channel of a cooling medium, between the opposing side faces of the two adjacent square battery cans.

PTL 1: WO 2012/032697
PTL 2: Japanese Patent Application Publication No. 2013-131428
PTL 3: Japanese Patent Application Publication No. 2009-004362
PTL 4: Japanese Patent Application Publication No. 2011-192642

SUMMARY

Detailed studies by the inventors on the partition members disclosed in PTL 1 to 4 have revealed shortcomings such as those below.

During abnormal heat generation, specifically, the partition member disclosed in PTL 1 relies on the heat of vaporization and the extinguishing capability of a coolant such as water, and just exploits the latent heat of the sealed-in coolant such as water, which vaporizes only once. Heat removal capacity is thus low and, moreover, the coolant such as water is released instantly when the abnormal heat generation occurs; as a result, it is not possible to sufficiently utilize the heat of vaporization of the coolant such as water that is contained in the partition member.

Also in the partition member disclosed in PTL 2 there can be utilized only the latent heat generated when the coolant such as water vaporizes just once.

The partition member disclosed in PTL 3 exploits an extinguishing function elicited when a filler having extinguishing ability such as water, that is present inside the partition member, flows out of the partition member in the event of an abnormality, and thus there can be utilized only the latent heat generated as the sealed-in filler vaporizes just once.

In the partition member disclosed in PTL 4, a refrigerant flows from outside the partition member, via a flow channel, into the partition member, and after having flowed through the interior of the partition member, flows then to the exterior thereof, wherein a function is exploited of removal of heat generated by cells, through transfer of heat to the outflowing refrigerant and/or through absorption of heat accompanying vaporization of the refrigerant, such that by arranging a heat exchanger in a flow channel outside the partition member, it becomes possible to utilize the heat of vaporization from the multiple times that the refrigerant vaporizes, to cool the cells. However, this configuration requires for instance external piping, an external liquid feeding device and a heat exchanger, other than the partition member. This is disadvantageous in terms of the larger weight and volume of the resulting assembled battery having a cooling function. Moreover, if flow of the refrigerant is interrupted on account of an abnormality in the external liquid feeding device, or in the flow channel outside the partition member, then there can be utilized only the latent heat generated when the coolant such as water vaporizes just once.

From all the above it was found that in a case where the cells and modules of PTL 1 to 4 underwent local abnormal heat generation, the function of cooling the abnormally heated portion safely, without allowing that single cells around an abnormally heated single cell should reach thermal runaway on account of transfer of heat from the abnormally heated single cell, was insufficient. Further, the large weight and volume of the assembled battery having a cooling function, in the assembled battery system and module disclosed in PTL 4, were found to be drawbacks.

In the light of the above problems, it is an object of embodiments of the present invention to provide a partition member and assembled battery which, in a case where a single cell that makes up the assembled battery becomes abnormally heated, can promote safe cooling of an abnormally heated portion, without allowing that cells in the periphery of the abnormally heated portion should reach thermal runaway. It is a further object of the present invention to provide a partition member and an assembled battery, having that function, in the form of implementations of light weight and small size.

All the technologies disclosed in PTL 1 to 3 above envisage removal of heat through evaporation of a coolant such as water, under the assumption that heat from a partition member only moves mainly between the partition member and single cell surfaces. In these technologies, specifically, cooling was accomplished simply on account of the latent heat of evaporation in one single cell having heated up. The technology disclosed in PTL 4 envisages inflow of a refrigerant into a partition member from outside, and outflow of the refrigerant from the interior of the partition member. In this technology, specifically, piping and an external liquid feeding device were used in an external flow channel, besides the partition member. Such being the case, inventors conceived of controlling the direction of heat transfer in a partition member in contact with an abnormally heated single cell, to thereby control heat transfer in the surface direction of the partition member, in particular not only in a single cell having heated up, but also for instance in other single cells juxtaposed with that single cell. The inventors further conceived of, by using such a partition member alone, making the cells themselves and/or the module structure into heat sinks by exploiting the heat capacity of the foregoing, and promote as a result safe cooling of an abnormally heated portion without allowing that normal cells in the periphery of the abnormally heated portion should reach thermal runaway, despite the light weight and small size of the components.

As a configuration in which a partition member having the above function is realized, it was found that by filling the partition member with a fluid having a boiling point such that the fluid vaporizes upon abnormal heat generation, and by providing a flow channel through which that fluid moves, it becomes possible to switch the direction of transfer of heat depending on the temperature, and to efficiently remove heat and elicit cooling. Specifically, the embodiments of the present invention is as follows.

[1] A partition member which has a thickness direction and a surface direction perpendicular to the thickness direction, and which separates single cells that make up an assembled battery in the thickness direction, or a single cell that makes up the assembled battery in the thickness direction and a member other than the single cells, the partition member comprising:

in the interior thereof, a fluid having a boiling point at normal pressure of 80° C. to 250° C., and a flow channel of the fluid extending along the surface direction, wherein the fluid is held in a fluid holding part, and the fluid holding part is hermetically sealed by a packaging material.

[2] A partition member which has a thickness direction and a surface direction perpendicular to the thickness direction, and which separates single cells that make up an assembled battery in the thickness direction, or a single cell that makes up the assembled battery in the thickness direction and a member other than the single cells, the partition member comprising:

in the interior thereof, a fluid holding part capable of holding a fluid having a boiling point at normal pressure of 80° C. to 250° C., and a flow channel of the fluid extending along the surface direction, wherein the fluid holding part is hermetically sealed by a packaging material.

[3] The partition member according to [1] or [2], wherein the flow channel includes a continuous space through which the fluid is capable of moving and which has a length of 1 mm or greater, and the space is a space in which a sphere capable of being inscribed in a region of the space has a diameter of 0.1 mm or greater, the region taking up 90% or more of the volume of the space.

[4] The partition member according to any one of [1] to [3], wherein the fluid contains at least one selected from the group consisting of water, alcohols, esters, ethers, ketones, hydrocarbons, fluorine-based compounds and silicone-based oils.

[5] The partition member according to any one of [1] to [4], wherein a porous body containing the fluid is provided in the interior of the partition member, and the flow channel is formed in the porous body.

[6] The partition member according to [5], wherein the porous body contains at least one from among a fibrous layer and a particle layer.

[7] The partition member according to claim [6], wherein the porous body contains a fibrous layer, and is at least one selected from a group consisting of a glass fiber sheet, a ceramic fiber sheet, paper, a cotton sheet, a porous ceramic plate, a porous glass plate, a polyimide fiber sheet, an aramid fiber sheet and a polytetrafluoroethylene fiber sheet.

[8] The partition member according to [6] or [7], wherein the porous body contains a particle layer, and is at least one selected from a group consisting of silica particles, alumina particles, zeolite particles, glass particles and carbon particles.

[9] The partition member according to any one of [1] to [8], wherein the length of the flow channel in a height direction or a width direction of the partition member is a half or more of the length of the partition member in the height direction or the width direction.

[10] The partition member according to [5], comprising the packaging material that encloses the porous body.

[11] An assembled battery, comprising the partition member according to any one of [1] to [10].

[12] The assembled battery according to [11], wherein the surface direction of the partition member includes a width direction of the partition member;

and the length of the partition member in the width direction is greater than the length of single cells, which are separated by the partition member, in the width direction.

[13] The assembled battery according to [11] or [12], wherein one of two thickness-direction surfaces of the partition member has a first region opposing a first single cell in the assembled battery and a second region not opposing the first single cell, and, in the second region, opposes at least one from among a second single cell in the assembled battery different from the first single cell, and a member other than the single cells.

[14] The assembled battery according to [13], wherein the other of the two thickness-direction surfaces of the partition member opposes at least one from among a third single cell and a member other than the single cells in the assembled battery, the third single cell being different from the first single cell and the second single cell, and present at a position not opposing the first single cell across the partition member.

[15] The assembled battery according to [11], wherein one of the two thickness-direction surfaces of the partition member opposes a first single cell among a plurality of single cells included in the assembled battery, and the other of the two thickness-direction surfaces opposes at least one from among a single cell in the assembled battery and a member other than the single cells in the assembled battery, the single cell being different from the first single cell, and present at a position not opposing the first single cell across the partition member.

BRIEF DESCRIPTION OF DRAWINGS

FIG. 6 is a set of explanatory diagrams of the operation of a partition member 1.

FIG. 7 is a set of diagrams illustrating schematically a first case in which one of a plurality of single cells in a row/column array reaches a high temperature.

FIG. 8 is a set of diagrams illustrating schematically a second case of a local high temperature site occurring within one single cell.

FIGS. 13A and 13B is a set of a front-view diagram and a side-view diagram illustrating schematically the configuration of a member used for a measurement test of the rate of heat flowing through a partition member of Example 1.

DESCRIPTION OF EMBODIMENTS

Figure 1:
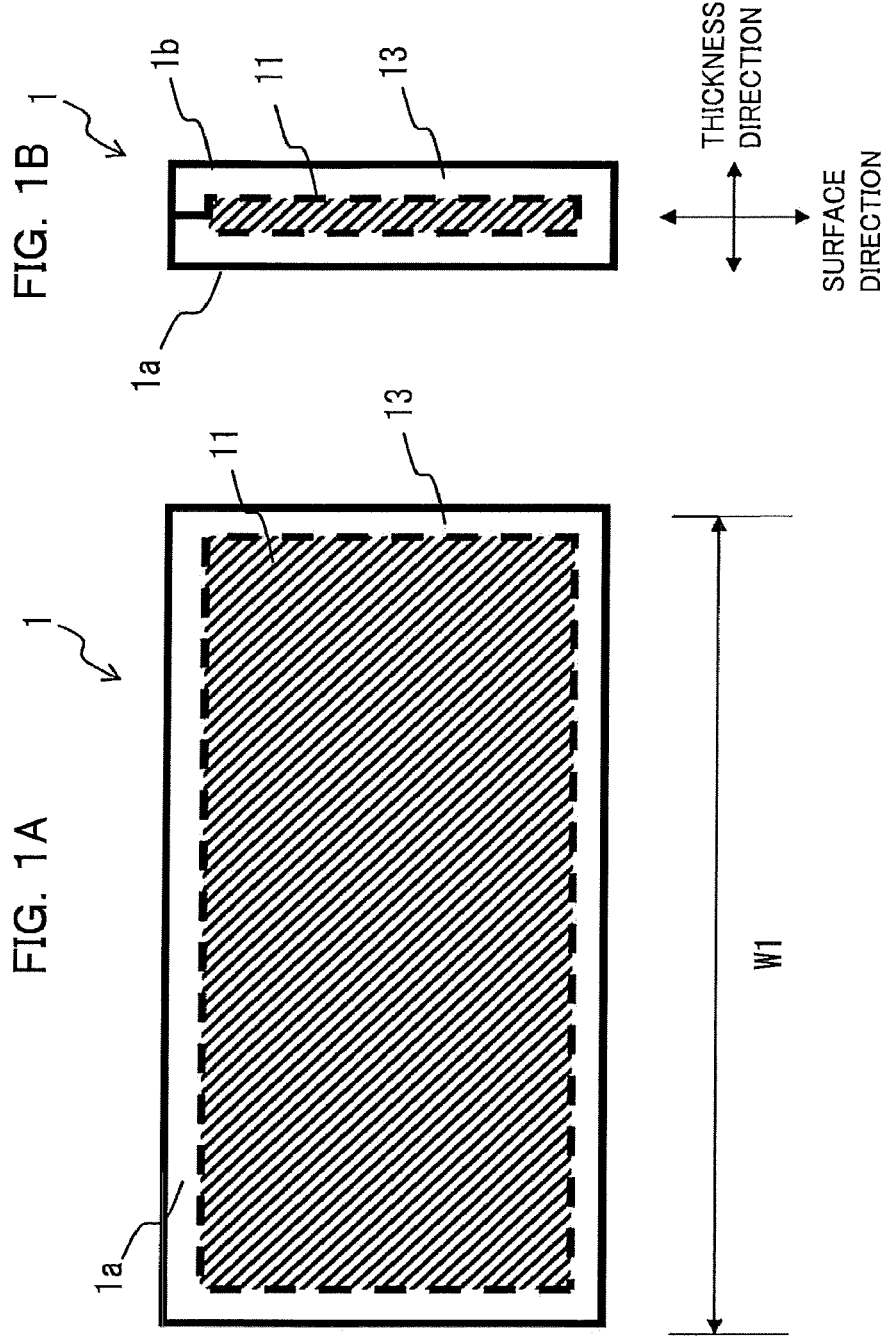
FIG. 1A is a front-view diagram illustrating a configuration example of a partition member according to an embodiment.
FIG. 1B is a left side-view diagram of the partition member illustrated in FIG. 1A.

Embodiments of the present invention will be explained next in detail. The explanation below concerning configurational requirements is an example (representative example) of embodiments of the present invention, but the invention is not limited to the content of the embodiments, so long as the gist of the invention is not departed from.

In the present embodiment, a situation where a single cell that makes up an assembled battery is in an "abnormal heat generation state" refers to a state where part or the entire area of a single cell is at or above 200° C., on account of short-circuits inside the single cell or on account of decomposition reactions with generation of heat. The term "thermal runaway" denotes a phenomenon whereby a single cell reaches an abnormal heat generation state and the rate of heat generation in the single cell exceeds a cooling rate, whereby the temperature can no longer be controlled. The wording "at normal times" (normal temperature) denotes a state where the temperature of a single cell is 80° C. or lower. However, the term denotes also a state in which a single cell is at or below an upper limit of temperature, which may be of 80° C. or higher, at which the single cell is charged and discharged normally without severe degradation in capacity, in which the upper limit of temperature is, for instance, an upper limit temperature of operation designated by the manufacturer.

[Partition Member]

The partition member according to the present embodiment has a thickness direction and a surface direction perpendicular to the thickness direction, and separates single cells that make up an assembled battery in the thickness direction, or a single cell that makes up the assembled battery in the thickness direction and a member other than the single cells. The partition member has, in the interior thereof, a fluid having a boiling point at normal pressure of 80° C. to 250° C., and a flow channel of the fluid extending along the surface direction, wherein the fluid is held in a fluid holding part, and the fluid holding part is hermetically sealed by a packaging material. A partition member according to another embodiment, has a thickness direction and a surface direction perpendicular to the thickness direction, and separates single cells that make up an assembled battery in the thickness direction, or a single cell that makes up the assembled battery in the thickness direction and a member other than the single cells. The partition member has, in the interior thereof, a fluid holding part capable of holding a fluid having a boiling point at normal pressure of 80° C. to 250° C., and a flow channel of the fluid extending along the surface direction, such that the fluid holding part is hermetically sealed by a packaging material. In other words, the partition member according to the present embodiment is provided with a fluid holding part capable of holding a fluid having a boiling point at normal pressure of 80° C. to 250° C., a flow channel of the fluid extending along the surface direction, and a packaging material that hermetically seals the fluid holding part and the flow channel.

Figure 2:
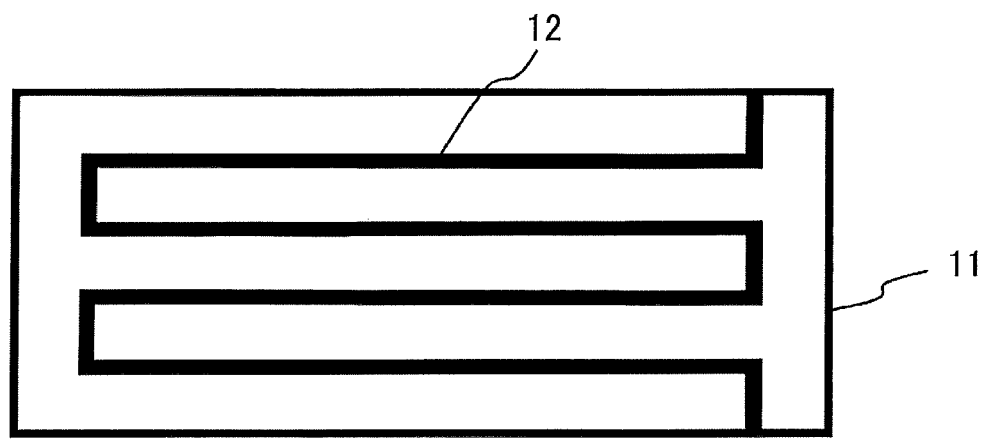
FIG. 2 is diagram illustrating an example of a flow channel of a fluid holding part provided in the interior of a partition member.

FIG. 1A is a front-view diagram illustrating a configuration example of a partition member according to an embodiment, and FIG. 1B is a left side-view diagram of the partition member illustrated in FIG. 1A. FIG. 2 is an example of a flow channel of a fluid holding part provided inside the partition member.

As an example, the outer shape of the partition member 1 is a plate-shaped or sheet-like shape having thickness. The partition member 1 may also take on a shape (arched shape, L-shaped or semicircular shape) other than a flat plate-like shape or a sheet-like shape, depending on the shape of the target to be separated by the partition member.

In the example illustrated in FIG. 1A, the partition member 1 is formed to a flat plate-like shape having height, width and thickness, and has a thickness direction and a surface direction. The surface direction is perpendicular to the thickness direction. So long as the surface direction is perpendicular to the thickness direction, the surface direction includes the height direction, a width direction and an oblique direction of the partition member 1.

The partition member 1 is used in order to partition from each other, in the thickness-direction, single cells that make up the assembled battery, or single cells that make up the assembled battery and members other than single cells. The partition member 1 has a flat surface 1a and a flat surface 1b on the side opposite that of the flat surface 1a, as two surfaces in the thickness direction. The flat surface 1a is an example of one of two thickness-direction surfaces, and flat surface 1b is an example of the other of the two thickness-direction surfaces. However, the flat surface 1a and the flat surface 1b may be curved surfaces or uneven surfaces. Members other than single cells include, for instance, the case of the assembled battery. The members other than the single cells need not be constituent elements of the assembled battery.

Preferably, the thickness of the partition member 1 when disposed between single cells inside the assembled battery, under a restraint pressure load set to lie in the range of 0.1 MPa to 5 MPa mainly in the thickness direction, is 95% to 30% of the thickness in a state where the restraint pressure is absent. The restraint pressure setting is however not limited to the above value range.

The partition member 1 has, in the interior thereof, a fluid the boiling point of which at normal pressure is 80° C. to 250° C., and a flow channel of the fluid, extending along the surface direction of the partition member 1.

[Fluid]

The wording "fluid the boiling point of which at normal pressure is 80° C. to 250° C." denotes a fluid having a boiling point in the range of 80° C. to 250° C. at normal pressure (1 atmosphere). The fluid is not particularly limited as long as it has the above boiling point, and can be either in a liquid state or in a gaseous state at normal pressure. Instances will be exemplified below of one type alone of fluid having a boiling point of 80° C. to 250° C. at normal pressure (1 atmosphere). However, a mixture of two or more types of fluid can be used as the fluid in the present invention, so long as the boiling point of the mixture lies within the above temperature range, even if the boiling point of just one respective type lies outside the above temperature range.

The fluid preferably contains, for instance, at least one selected from the group consisting of water, alcohols, esters, ethers, ketones, hydrocarbons, fluorine-based compounds and silicone-based oils.

Examples of alcohols that can be used as the fluid include alcohols having 3 to 8 carbon atoms such as propanol, isopropanol, butanol, benzyl alcohol and phenylethyl alcohol, and divalent or higher alcohols including alkylene glycols such as ethylene glycol and propylene glycol. The foregoing can be used as single types alone, or in the form of mixtures of two or more types.

Esters that can be used as the fluid include alkyl aliphatic carboxylic acid esters, alkyl carbonate diesters, alkyl oxalate diesters and fatty acid esters of ethylene glycol. Examples of alkyl aliphatic carboxylic acid esters include lower alkyl formate esters such as methyl formate, n-butyl formate and isobutyl formate; and lower alkyl aliphatic carboxylic acid esters including lower alkyl acetate esters such as n-propyl acetate, isopropyl acetate, n-butyl acetate and isobutyl acetate, as well as lower alkyl propionic acid esters such as ethyl propionate, n-propyl propionate, isopropyl propionate, n-butyl propionate and isobutyl propionate. Examples of alkyl carbonate diesters include lower alkyl carbonate diesters such as dimethyl carbonate, diethyl carbonate, dibutyl carbonate and methyl ethyl carbonate. Examples of alkyl oxalate diesters include lower alkyl oxalate diesters such as dimethyl oxalate and diethyl oxalate. Examples of ethylene glycol acetate esters include propyl acetate and butyl acetate. Examples of fatty acid esters of ethylene glycol include ethylene glycol acetate esters. The foregoing can be used as single types alone, or in the form of mixtures of two or more types.

Ethers that can be used in the fluid include n-butyl ether, n-propyl ether and isoamyl ether. The foregoing can be used as single types alone, or in the form of mixtures of two or more types.

Ketones that can be used in the fluid include, for instance, ethyl methyl ketone and diethyl ketone. The foregoing can be used as single types alone, or in the form of mixtures of two or more types.

Examples of hydrocarbons that can be used in the fluid include heptane, octane, nonane, decane, toluene and xylene. The foregoing can be used as single types alone, or in the form of mixtures of two or more types.

Examples of fluorine-based compounds that can be used in the fluid include 1,1,2,2,3,3,4-heptafluorocyclopentane (HFC-c447ef) and 1,1,1,2,2,3,3,4,4,5,5,6,6-tridecafluorooctane (HFC-76-13sf), which are refrigerants. The foregoing can be used as single types alone, or in the form of mixtures of two or more types.

Examples of silicone-based oils that can be used in the fluid include methylpolysiloxane, methylphenylpolysiloxane, cyclic methylsiloxane and modified silicone oils such as silicone polyether copolymers. The foregoing can be used as single types alone, or in the form of mixtures of two or more types.

[Fluid Holding Part]

A fluid holding part 11 that holds the above-described fluid is provided in the interior of the partition member 1. In the example illustrated in FIG. 2 the fluid holding part 11 is formed to have a flat plate-like or sheet-like shape. The fluid holding part 11 is hermetically sealed by a flat plate-shaped or sheet-shaped packaging material 13. The fluid holding part 11 has a fluid flow channel 12 such as that illustrated in FIG. 2.

The fluid holding part 11 is formed of a material that contains a porous body. Preferably, the porous body contains at least one from among a fibrous layer and a particle layer. Preferably, the porous body containing the fibrous layer is, for instance, at least one selected from a group consisting of a glass fiber sheet, a ceramic fiber sheet, paper, a cotton sheet, a porous ceramic plate, a porous glass plate, a polyimide fiber sheet, an aramid fiber sheet and a polytetrafluoroethylene (PTFE) fiber sheet. A porous body containing a particle layer is preferably at least one selected from a group consisting of silica particles, alumina particles, zeolite particles, glass particles and carbon particles. The fluid holding part 11 may be formed entirely out of a porous body. The thickness-direction thermal conductivity of the fluid holding part when dry may be 0.5 W/(m K) or lower, more preferably 0.2 W/(m K) or lower. In the explanation below an example will be illustrated of an instance where the fluid holding part 11 is formed of a porous body. The packaging material 13 encloses the porous body.

The fluid is held in the flow channel 12 or a cavity of the porous body contained in the fluid holding part 11. For instance, the fluid holding part 11 is impregnated with the fluid by being immersed in the fluid; the fluid holding part 11 can hold the fluid as a result. Alternatively, the fluid can be incorporated into the fluid holding part 11, through introduction (filling) of the fluid, via the opening of the packaging material 13 having the fluid holding part 11 accommodated therein.

[Flow Channel]

The partition member 1 has a flow channel of a fluid extending in the surface direction. In the present embodiment the flow channel 12 includes a continuous space through which the fluid is capable of moving and which has a length of 1 mm or greater, and the space is a space in which a sphere capable of being inscribed in a region of the space has a diameter of 0.1 mm or greater, the region taking up 90% or more of the volume of the space.

FIG. 2 illustrates an example of the flow channel 12 of the fluid holding part 11. In the example of FIG. 2, the flow channel 12 is formed to a meandering shape in which a flow channels extending in the height direction of the fluid holding part 11 (partition member 1) and flow channels extending in the width direction are connected to each other. The ends of the flow channel 12 reach the outer edge of the fluid holding part 11. The shape of the flow channels that form the flow channel 12 and the number of those constituent flow channels can be set as appropriate. The ends of the flow channel 12 need not necessarily reach the outer edge of the fluid holding part 11 as illustrated in FIG. 2. Preferably, for instance the flow channel 12 is formed so that the length of the flow channel 12 in the height direction or the width direction of the partition member 1 is a half or more of the length of the partition member 1 in the height direction or the width direction. The flow channel 12 need not necessarily be formed along straight lines, and may be curved.

The flow channel 12 may be a groove formed on the surface of the fluid holding part 11, or linear holes running through the fluid holding part 11, or cavities formed in the interior of the fluid holding part 11. The flow channel 12 may be formed through working of one member made up of a material of a fluid holding part such as that described above; alternatively, the flow channel 12 may be formed by combining a plurality of materials of the fluid holding part. The flow channel 12 is formed along the surface direction, and hence can include directions deviating slightly from the surface direction, other than directions extending in the surface direction. In the partition member 1 according to the present embodiment, preferably, a porous body (fluid holding part 11) containing a fluid is provided thus in the interior of the partition member 1, and the flow channel 12 is formed in the porous body.

[Packaging Material]

The packaging material 13 encloses the fluid holding part 11 and hermetically seals off the fluid holding part 11 that holds the fluid. For instance, a resin sheet, a resin film, or a resin-made pouch bag can be used as the packaging material 13. For instance, the fluid holding part 11 that holds the fluid is hermetically sealed by sandwiching the fluid holding part 11 between two resin sheets or resin films, or by tucking the fluid holding part 11 in a folded resin sheet or resin film, and by thermally fusing or bonding then the sheets or films. The packaging material 13 is however not necessarily required. In the case for instance where the fluid holding part 11 is formed out of a porous material or the like having high water-absorbing properties, the fluid holding part 11 can hold a desired amount of fluid for a desired time, even in the absence of the packaging material 13. The fluid acts as a heat transfer medium, and accordingly the greater the amount of fluid in the fluid holding part 11, the better heat transfer can be promoted. Specifically, there is held a volume of fluid that is preferably 20% or more, and more preferably 50% or more, of the volume resulting from combining the volume of the flow channel and the voids of the porous body. The upper limit is not particularly limited, but is ordinarily 100%.

[Assembled Battery]

An assembled battery where the partition member 1 is utilized will be explained next. The partition member according to the present embodiment is provided with the partition member described above. The assembled battery is utilized in a battery pack mounted, for instance, in electric vehicles (EVs), hybrid electric vehicles (HEVs), plug-in hybrid electric vehicles (PHEVs), electric heavy equipment, electric bikes, electrically assisted bicycles, ships, aircraft, trains, uninterruptible power supplies (UPSs), household storage systems, and storage battery systems for stabilization of electric power systems that utilize renewable energy such as wind power/solar power/tidal power/geothermal power. However, the assembled battery can also be used as a power source for supplying power to equipment other than the abovementioned EVs and so forth.

[Single Cells]

Figure 3:
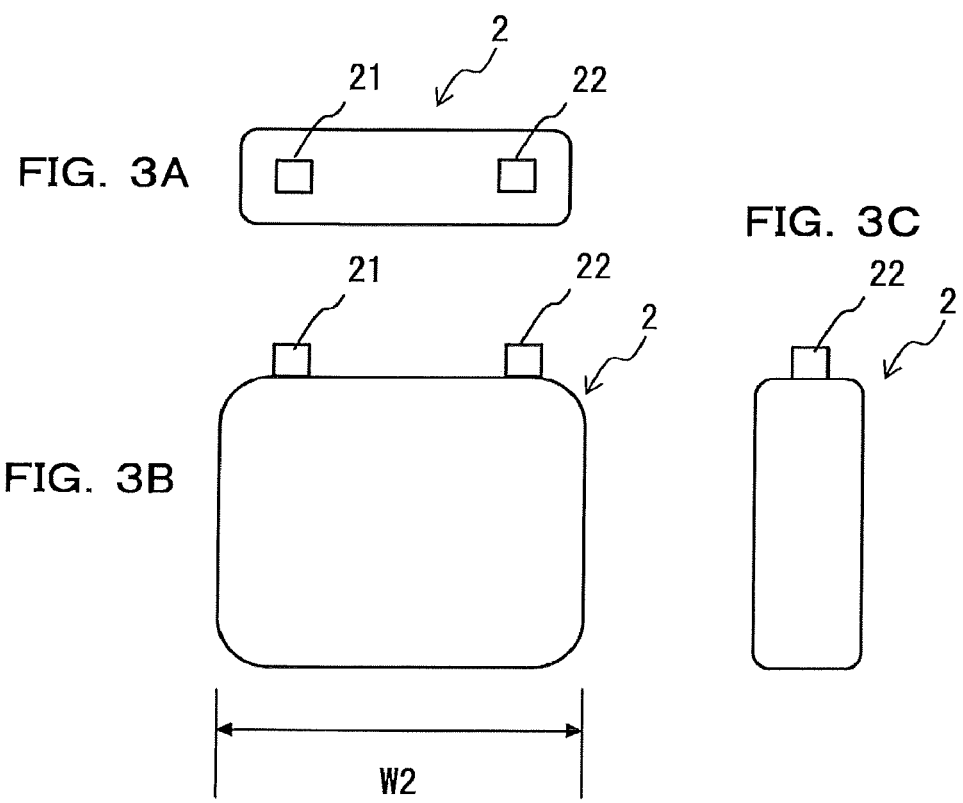
FIG. 3A is a plan-view diagram illustrating an example of a single cell (cell) that makes up an assembled battery.
FIG. 3B is a front-view diagram illustrating an example of a single cell (cell)
FIG. 3C is a side-view diagram illustrating an example of a single cell (cell).

FIG. 3A is a plan-view diagram illustrating an example of a single cell (cell) that makes up an assembled battery, FIG. 3B is a front-view diagram illustrating an example of a single cell (cell), and FIG. 3C is a side-view diagram illustrating an example of a single cell (cell).

The single cell 2 has a rectangular parallelepiped shape having length a longitudinal dimension (thickness), a transversal dimension (width), and height, and has terminals 21, 22 provided on the top face. The single cell 2 is a lithium ion secondary battery cell provided, for instance, with a positive electrode and a negative electrode capable of storing and releasing lithium ions, and with an electrolyte. Besides lithium ion secondary battery cells, there can be used lithium ion all-solid-state battery cells, nickel-hydride battery cells, nickel cadmium battery cells and lead storage battery cells.

[Assembled Battery]

Figure 4:
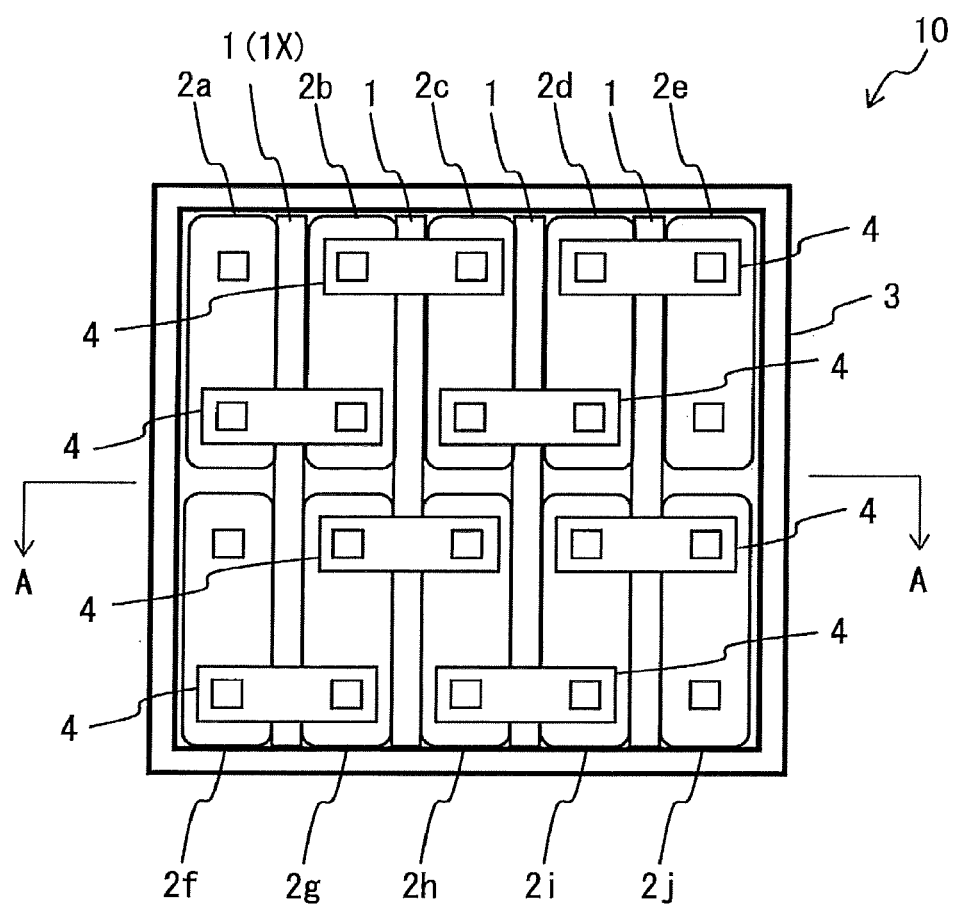
FIG. 4 is a plan-view diagram illustrating an example of an assembled battery formed using a plurality of single cells.
Figure 5:
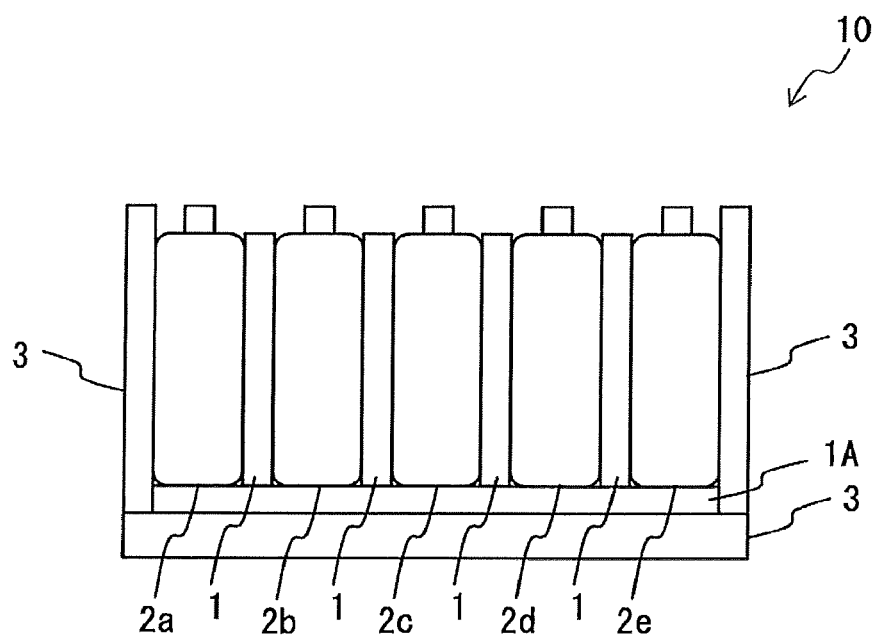
FIG. 5 is a diagram illustrating an end face resulting from cutting the assembled battery depicted in FIG. 4 along line A-A.

FIG. 4 is a plan-view diagram illustrating an example of an assembled battery formed using a plurality of single cells. FIG. 5 is a diagram illustrating an end face resulting from cutting the assembled battery depicted in FIG. 4 along line A-A. In FIG. 4 the assembled battery 10 is formed through arrangement of single cells 2 in m columns and n rows. Herein m and n are natural numbers equal to or greater than 1. In the example illustrated in FIG. 4, the single cells 2 are arrayed in 2 columns and 5 rows (m=2 and n=5). In the first column, single cell 2a through single cell 2e are juxtaposed in the thickness direction of the single cells, while in the second column, single cell 2f through single cell 2j g are juxtaposed in the thickness direction of the single cells. The numbers of rows and columns can be set as appropriate. The assembled battery may be formed by lining up a plurality of single cells 2 in one column.

The plurality of single cells 2 that make up the array are accommodated in a case 3 having a bottom face and four side faces. The partition members 1 described above are disposed between rows in the array of the single cells 2, such that respective single cells 2 positioned in a same row are partitioned from each other in the thickness direction of the partition member 1. For instance, the single cell 2a and the single cell 2f positioned in the first row, and the single cell 2b and the single cell 2g positioned in the second row, are partitioned from each other by a partition member 1X as a partition member 1. For example, the flat surface 1a of the partition member 1X (see FIG. 1B) opposes the single cell 2a and the single cell 2f, and the flat surface 1b opposes the single cell 2b and the single cell 2g. Other rows are similarly separated by respective partition members 1. Preferably, the length W1 (see FIG. 1A) of the partition members 1 in the width direction is greater than the length W2 (see FIG. 3B) of the single cells 2 in the width direction.

In the present embodiment an example will be explained wherein the face of a single cell 2 opposing a respective partition member 1 is in contact with a thickness-direction surface (flat surface 1a or 1b) of the partition member 1. Each single cell 2 may be set to be in contact with a respective partition member 1, for instance, at a contact point or a projection formed in at least one from among the single cell 2 and the partition member 1. The single cell 2 may be disposed in a state of being spaced from a respective partition member 1 by a member other than partition member 1.

A positive electrode terminal (for instance terminal 21) and a negative electrode terminal (for instance a terminal 22) of adjacent single cells 2 among single cell 2a through the single cell 2e, and the single cell 2f through the single cell 2j, are connected electrically in series by respective bus bars 4. Predetermined power is outputted herein, for instance, as a result of series connection of the single cell 2a through the single cell 2e, and the single cell 2f through the single cell 2j.

The case 3 accommodates the single cells 2 that make up the assembled battery 10. As illustrated in FIG. 5, a partition member 1A is disposed between the bottom face of the case 3 and the single cells 2 constituting a row/column array. The partition member 1A has the same configuration as the partition member 1. The bottom face (bottom wall) of the case 3 is an example of a member other than single cells. Respective partition members 1 may be disposed between the side wall of the case 3 and the single cells 2. The assembled battery may be integrated by clamping, between shared end plates, the columns of the plurality of single cells 2 constituting a row/column array, and by fastening the whole using connecting members, instead of relying on the case 3. In FIG. 4, for instance, at least one from the single cell 2a through single cell 2e may be a member other than a single cell.

<Operation of Partition Member>

FIG. 6 is a set of explanatory diagrams of the operation of the partition member 1. The temperature of the assembled battery may rise locally, for instance, due to micro short-circuits in the single cells 2 and generation of heat in terminal portions (terminal 21 and terminal 22). A local high temperature includes herein an instance (first case) where one of the plurality of single cells constituting a row/column array reaches a high temperature, and an instance (second case) where a local high-temperature site arises within one single cell 2.

FIG. 6A illustrates schematically the first case. For example, an instance will be envisaged herein in which the entirety of the single cell 2a has reached abnormal heat generation, for a partition member 1 (1K: FIG. 4) that opposes the single cell 2a and the single cell 2f.

FIG. 6B illustrates schematically the second case. For instance, a local portion 2A of a single cell 2 (single cell 2a) that opposes the flat surface 1a of a partition member 1 (1X: FIG. 4) will be assumed herein to have reached abnormal heat generation.

Both in the first case and the second case, the fluid held in the fluid holding part 11, in a region opposing a high temperature portion of the single cell 2 (single cell 2a, portion 2A), receives heat from the high temperature portion and vaporizes, as illustrated in FIG. 6C. The vaporized fluid moves mainly through the flow channel 12, and moves, along with heat, to sites not opposing the high temperature portion. The temperature at sites not opposing the high temperature portion is lower than at the high temperature portion; in consequence, the vaporized fluid condenses, and becomes liquid again. The liquefied fluid moves, with latent heat, mainly to the high temperature portion, through the flow channel 12. The high temperature portion is cooled in that the heat thereof is carried away by virtue of such circulation of the fluid moving in the surface direction.

The fluid moves from the high temperature portion to a low temperature portion, by capillary action, through the pores of the porous body. In the present embodiment, however, the fluid collected in the flow channel 12 can move smoothly through the flow channel 12, in the surface direction, by virtue of the fact that the flow channel 12, which is larger than the space of the porous body, is formed along the surface direction. That is, the transfer of the high-temperature fluid in the surface direction can be promoted thanks to the formation of the flow channel 12.

An opening may become formed in the packaging material 13 accompanying expansion derived from vaporization of the fluid, or accompanying a rise in temperature, whereupon the fluid may flow out through the opening (see reference symbol 5 in FIG. 6C). Removal of heat can be promoted by virtue of the fact that the fluid is discharged through the opening. Through formation of the opening, the interior of the partition member reaches a normal pressure, and there can be promoted heat transfer derived from expansion of the volume of the gas phase, as well as a cooling effect derived from latent heat of vaporization, that accompany the boiling of the fluid at normal pressure.

In a state of being held by the fluid holding part 11, the fluid constitutes a transfer medium of heat from the single cells 2, and has a predetermined thermal conductivity in the thickness direction of the partition member 1. When the fluid vaporizes, by contrast, there drops the thermal conductivity of the portion of the fluid holding part 11 where the vaporized fluid is present, and the portion acts now as a heat insulating layer.

A greater quantity of heat moves in the surface direction than in the thickness direction, on account of the above heat transfer in the surface direction and through formation of the heat insulating layer accompanying vaporization of the fluid; as a result, this allows suppressing heat transmitted to a single cell 2 (2b) that opposes the abnormally heated single cell 2 (2a) via the partition member 1 (1X), and allows preventing the single cell 2b from abnormally heating up.

FIG. 7 illustrates schematically the first case. FIG. 7A assumes normal operation of the assembled battery. The single cell 2a through the single cell 2f, and the single cell 2b through the single cell 2g, are separated by respective partition members 1X.

The partition members 1 (1X) exemplified in FIG. 7A have the following configuration. Specifically, preferably one of the two thickness-direction surfaces of the partition member has a first region opposing the first single cell in the assembled battery and a second region not opposing the first single cell, and in the second region, opposes at least one from among a second single cell in the assembled battery different from the first single cell, and a member other than the single cells.

In FIG. 7A, the flat surface 1b of the partition member 1X corresponds to the "one of the two thickness-direction surfaces of the partition member", A region 1c in the flat surface 1b, opposed by the single cell 2g separated by the partition member 1X, corresponds to the "first region opposing the first single cell in the assembled battery", and the single cell 2g corresponds to the "first single cell". Meanwhile, the region 1d in the flat surface 1b not opposed by the single cell 2g corresponds to the "second region not opposing the first single cell". The single cell 2b opposing the region 1d corresponds to the "second single cell in the assembled battery different from the first single cell". The member other than a single cell may oppose the region 1d instead of single cell 2b, or along with the single cell 2b.

The partition member 1 (1X) exemplified in FIG. 7A has the following configuration. Specifically, the other of the two thickness-direction surfaces of the partition member preferably opposes at least one from among a third single cell and a member other than the single cells in the assembled battery, the third single cell being different from the first single cell and the second single cell, and present at a position not opposing the first single cell across the partition member.

In FIG. 7A, the flat surface 1a of the partition member 1X corresponds to the "other of the two thickness-direction surfaces of the partition member". The single cell 2a opposing the flat surface 1a corresponds to the "third single cell being different from the first single cell and the second single cell, and present at a position not opposing the first single cell across the partition member". The member other than a single cell may oppose the region 1d instead of the single cell 2a, or along with the single cell 2a.

Normally (at normal temperature), as illustrated in FIG. 7A, the fluid in liquid form is evenly distributed in the fluid holding part 11. Accordingly, the partition member 1X has desired thermal conductivity between single cells 2 that oppose each other across the partition member 1X (between the single cell 2a and the single cell 2b, and between the single cell 2f and the single cell 2g).

An instance will be now assumed where the single cell 2g heats up abnormally, as illustrated in FIG. 7B. In this case, there vaporizes fluid present in a portion of the fluid holding part 11 corresponding to the region 1c that opposes the single cell 2g, and the vaporized fluid moves in the surface direction of the partition member 1X along with heat (see (1) in FIG. 7B). Fluid not having vaporized on the flat surface 1a side, from among the fluid at a position corresponding to the region 1c, suppresses transfer of heat to the single cell 2f, which is a single cell 2 (also referred to as "opposite-side single cell 2") that opposes the single cell 2g across the partition member 1X, and thus reduces heatup of the single cell 2f (see (2) in FIG. 7B).

The single cell 2b and the single cell 2a function as a heat sink and take up heat from the partition member 1X in a case where the respective temperatures of the single cell 2b opposing the region 1d of the flat surface 1b and of the single cell 2a opposing the flat surface 1a, and being an opposite-side single cell 2 of the single cell 2b, are not temperatures of abnormal heat generation (i.e. are temperatures lower than those in abnormal heat generation, i.e. are normal temperatures) (see (3) in FIG. 7B). The vaporized fluid in the fluid holding part 11 condenses as a result, reverting thus to a liquid state, and returns towards the high temperature portion. That is, the fluid circulates in the interior of the partition member 1X (fluid holding part 11).

As illustrated in FIG. 7C, the vaporized fluid is discharged out of the partition member 1X. Herein it will be assumed that the fluid holding part 11 is in a state of containing a gaseous fluid or air. In this case, the heat insulating layer is formed by air (gaseous-phase fluid) contained in the fluid holding part 11, and the heat transfer coefficient to the opposite-side single cell 2f is reduced. It becomes therefore possible to avoid abnormal heat generation of the single cell 2f derived from heat received from the single cell 2g.

FIG. 8 illustrates schematically the second case. FIG. 8A assumes normal operation of the assembled battery. The single cell 2a through the single cell 2f, and the single cell 2b through the single cell 2g, are separated by respective partition members 1X.

Normally (at normal temperature), as illustrated in FIG. 8A, the fluid of the liquid is uniformly distributed in the fluid holding part 11. Accordingly, the partition member 1X has desired thermal conductivity between single cells 2 that oppose each other across the partition member 1X (between the single cell 2a and the single cell 2b).

An instance will be now assumed where the single cell 2b heats up abnormally, as illustrated in FIG. 8B. In this case, there vaporizes fluid present in a portion of the fluid holding part 11 opposing a local high temperature portion (see 7 in FIG. 8B) of the single cell 2b, and the vaporized fluid moves in the surface direction of the partition member 1X (both end sides of the partition member 1X in the width direction) along with heat (see (1) in FIG. 8B). Fluid not having vaporized on the flat surface 1a side from among the fluid at a position corresponding to the high temperature portion 7 suppresses transfer of heat to the opposite-side single cell 2a of the single cell 2b, and thus reduces heatup of the single cell 2a (see (2) in FIG. 7B).

In a portion of the fluid holding part 11 not opposing the high temperature portion 7, the fluid is in a liquid state, and a heat transfer coefficient, to the single cell 2a, is maintained at a value close to that of at normal times. Thereby, the single cell 2a functions as a heat sink, and takes up heat coming from the high temperature portion 7 (see (3) in FIG. 8B). The vaporized fluid in the fluid holding part 11 condenses as a result, thus reverting to a liquid state, and returns towards the high temperature portion 7. That is, the fluid circulates in the interior of the partition member 1X (fluid holding part 11).

As illustrated in FIG. 8C the vaporized fluid is discharged out of the partition member 1X; when the fluid holding part 11 reaches a state of containing a gaseous fluid or air, the fluid holding part 11 functions as a heat insulating layer and the heat transfer coefficient to the opposite-side single cell 2a decreases, as explained with reference to FIG. 7C. It becomes therefore possible to avoid abnormal heat generation of the single cell 2a on account of heat received from the single cell 2b.

Figure 9:
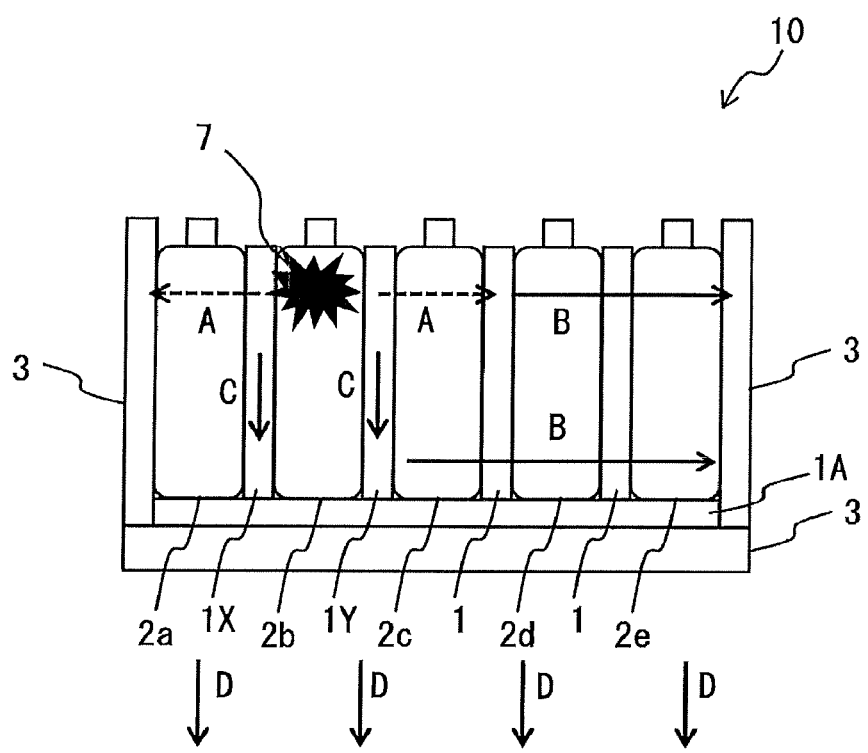
FIG. 9 is a diagram illustrating schematically heat transfer paths in cases where a single cell becomes abnormally heated, in the assembled battery 10 illustrated in FIG. 4.
Figure 10:
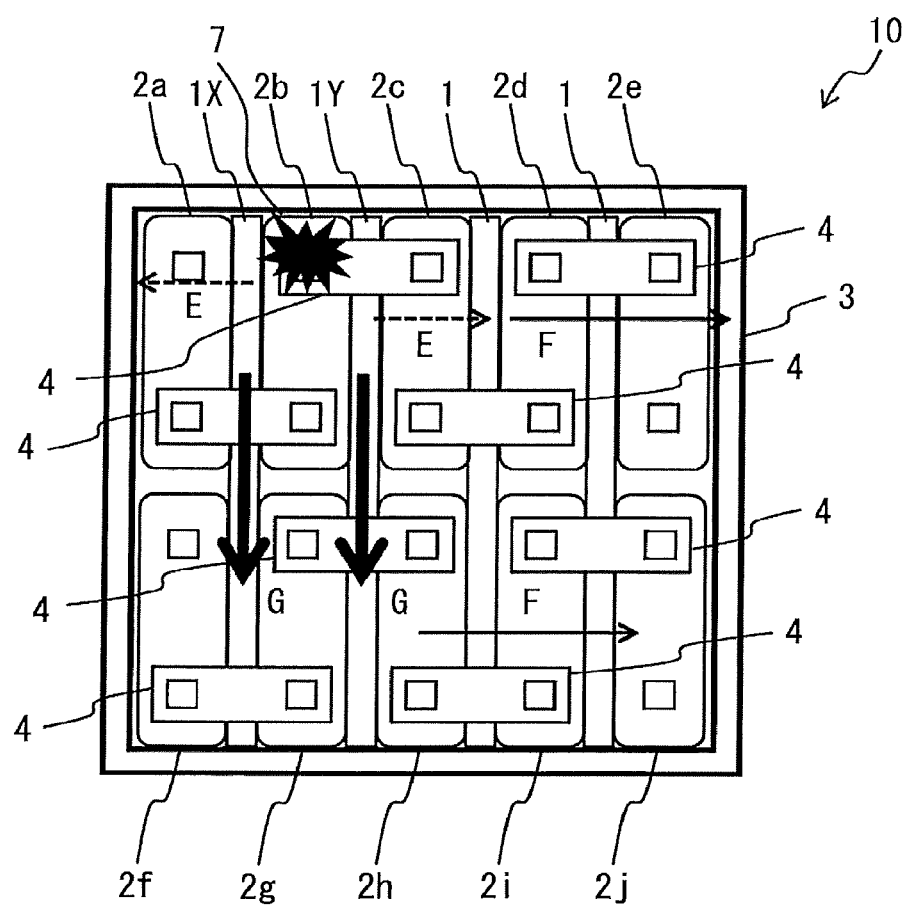
FIG. 10 is a diagram illustrating schematically heat transfer paths in cases where a single cell becomes abnormally heated, in the assembled battery 10 illustrated in FIG. 4.

FIG. 9 and FIG. 10 illustrate heat transfer paths in cases where the single cell 2b becomes abnormally heated, in the assembled battery 10 illustrated in FIG. 4. Upon abnormal heat generation of the top of the single cell 2b, the fluid contained in the fluid holding part 11 of the partition member 1 opposing the high temperature portion 7 vaporizes, as illustrated in FIG. 9, and there decreases the thermal conductivity of a partition member 1Y and of the partition member 1X at the portion where the fluid has vaporized. As a result there is suppressed the transfer of heat flowing in the thickness direction of the partition member 1 from the heat generation site of the single cell 2b towards the single cell 2a and the single cell 2c, as denoted by the dotted arrow A.

The fluid having vaporized by receiving heat from the high temperature portion 7 moves mainly in the surface direction (height direction) through the flow channel 12, and moves as a result to the lower part of the fluid holding part 11 of the partition member 1X and of the partition member 1Y. The fluid and the lower part of the fluid holding part 11 is in a liquid phase, and therefore the thermal conductivity between the single cell 2a and the single cell 2c, corresponding herein to opposite-side single cells 2, is maintained in a state approaching a normal state. Accordingly, the heat moving to the lower part of the fluid holding part 11 of the partition member 1X and of the partition member 1Y can move thus in the thickness direction, and be transmitted to the opposing single cell 2a and the opposing single cell 2c. The heat moved to the single cell 2c can be further transmitted towards the single cell 2d (solid arrows B) via the partition members.

The heat moving to the lower part of the fluid holding part 11 of the partition member 1X and of the partition member 1Y is transmitted to the partition member 1A, and moves in the surface direction of the partition member 1A. The bottom wall of the case 3 functions mainly herein as a heat sink, and can receive heat from the partition member 1A. Moreover, heat having moved to the bottom part of the case 3 is dissipated to the exterior, as denoted by the solid arrows D.

In FIG. 10 heat transfer from the high temperature portion 7 of the single cell 2b in the direction denoted by the arrows E is suppressed by the partition member 1X and the partition member 1Y. Heat from the high temperature portion 7 moves (arrows G) in the surface direction (width direction) of the partition member 1X and of the partition member 1Y. The single cell 2f, single cell 2g and single cell 2h function as heat sinks, and can receive heat from the partition member 1X and the partition member 1Y. The single cells are cooled through circulation of the fluid in the partition member 1X and the partition member 1Y. In a case where most of the fluid has vaporized or has been discharged out of the partition member 1X, the fluid holding part 11 functions as a heat insulating layer, and suppresses transfer of heat to opposite-side single cells.

In the partition member 1 and assembled battery 10 explained above, abnormally heated portions can be cooled safely without allowing the single cells 2 that make up the assembled battery 10 to reach thermal runaway in a case where the assembled battery 10 undergoes abnormal heat generation locally.

Figure 11:
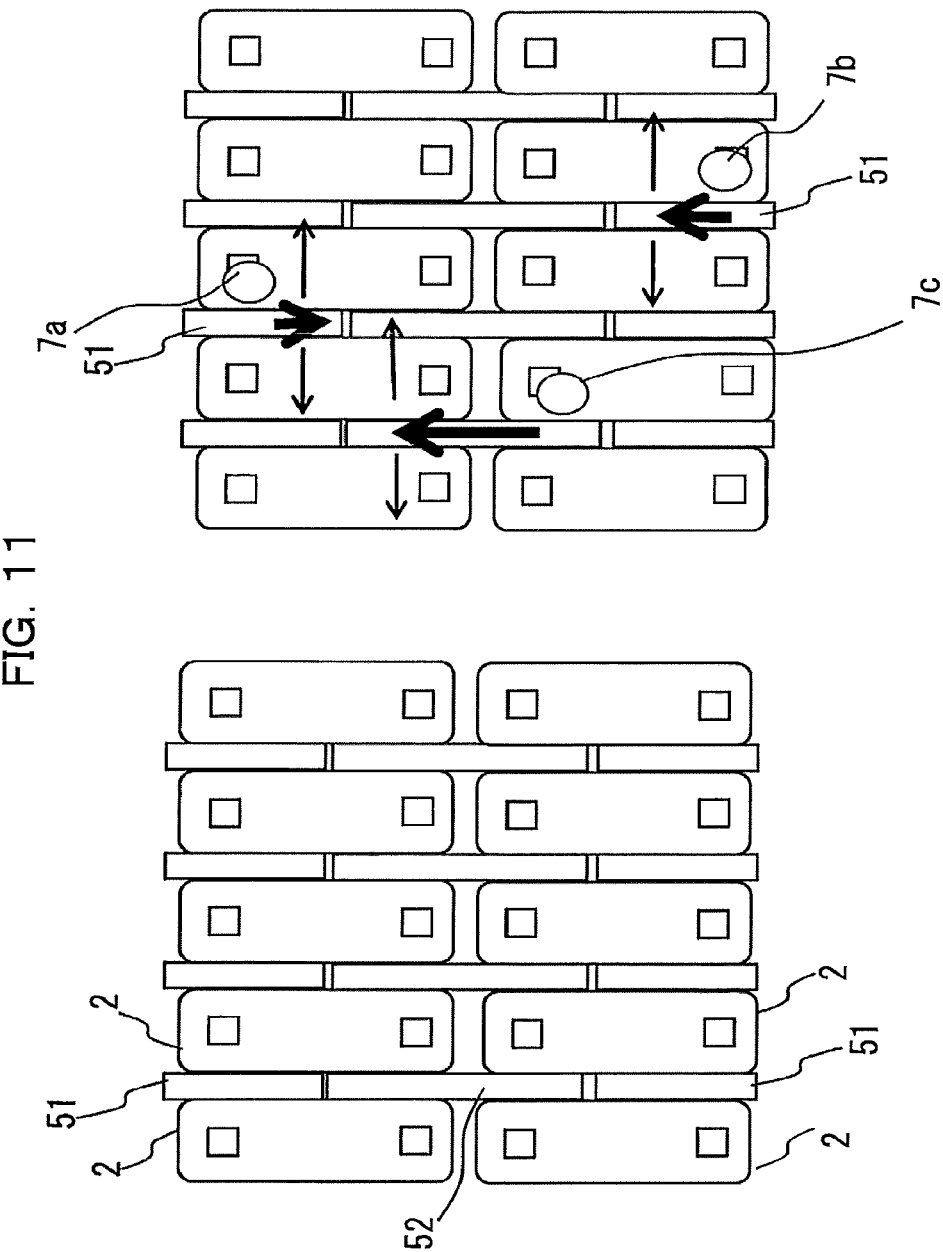
FIG. 11 is a set of diagrams illustrating variation 1 of an embodiment (FIG. 4).

FIG. 11 illustrates a variation 1 of the present embodiment (FIG. 4). In the present embodiment a configuration example is illustrated in which one partition member 1 separates respective rows in a column of single cells 2 (a respective partition member 1 opposing two single cells 2 is inserted between the rows of these single cells). Instead of the configuration, as illustrated on the left side of FIG. 11, each partition member disposed between rows is made up of partition members 51 opposing one single cell 2 and having a transversal length shorter than the transversal length W1 of the single cells 2, and a partition member 52 disposed so as to straddle two single cells at each surface of the thickness direction. Except for having dissimilar transversal length, the partition members 51 and the partition member 52 have the same configuration.

In variation 1, as illustrated on the right side of FIG. 11, heat is allowed to be transferred due to the effect of the second case explained with reference to FIG. 8, for local abnormal heat generation in single cells 2 such as those in the high temperature portion 7a and the high temperature portion 7b. Further, heat is allowed to be transferred due to the effect of the first case explained with reference to FIG. 7, for local abnormal heat generation in the single cells 2 such as local abnormal heat generation in the high temperature portion 7c.

Figure 12:
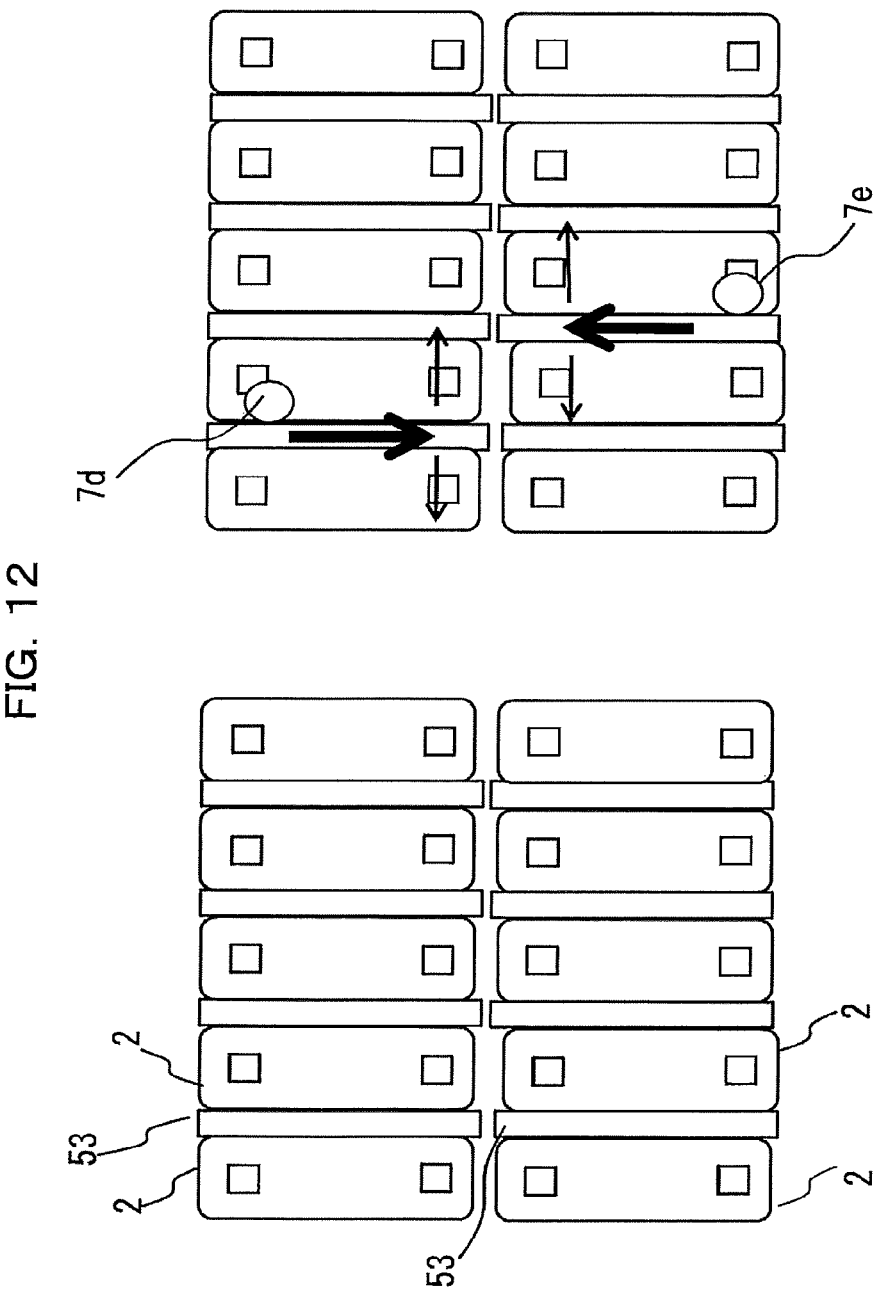
FIG. 12 is a set of diagrams illustrating variation 2 of an embodiment (FIG. 4).

FIG. 12 illustrates a variation 2 of an embodiment (FIG. 4). In the present embodiment a configuration example is illustrated in which one partition member 1 separates respective rows in a column of single cells 2 (a respective partition member 1 opposing two single cells 2 is inserted between the rows of these single cells). In lieu of the above configuration, herein for instance each partition member disposed between rows is configured in the form of a partition member 53 that separates the single cells 2 for each column, as illustrated in on the left side of FIG. 12. Except for having dissimilar transversal length, the partition member 53 and the partition member 1 have the same configuration.

In variation 2, as illustrated on the right side of FIG. 12, heat is allowed to be transferred due to the effect of the second case explained with reference to FIG. 8, for local abnormal heat generation in the single cells 2, such as local abnormal heat generation in the high temperature portion 7d and the high temperature portion 7e.

EXAMPLES

Concrete embodiments of present invention will be described next in further detail by way of examples, but these should not be construed as limiting the invention thereto in any way.

Example 1

As the fluid holding part 11 of the partition member 1, filter paper made of cellulose fibers (model No. 590, thickness 0.93 mm) by Advantec Toyo Kaisha, Ltd. was cut into a length of 50 mm and a width of 110 mm. Further, this filter paper (fluid holding part 11, hereafter also referred to as filter paper 11) was cut to create a 1 mm width flow channel 12 of meandering shape, as illustrated in FIG. 2, resulting from connection of flow channels extending in the height direction of the filter paper 11 and flow channels extending in the width direction of the filter paper 11. The filter paper 11 was sandwiched, in the manner illustrated in FIG. 1B, in a bag produced through folding of a 60 μm thick sheet (packaging material 13, hereafter notated also as sheet 13) made of PET, and the filter paper 11 was further impregnated with 6 g of water, to thereby yield a partition member 1 (FIG. 1A). As illustrated in FIG. 13A and FIG. 13B, a left-side 50 mm portion of the partition member 1 was sandwiched next in a stack of: a heater 30, an aluminum plate 31, a buffer 32A (porous zirconia-made plate, porosity 22%, by Hashimoto Riken Kogyo Co., Ltd.), an aluminum plate 31, an aluminum foil 33 (thickness 11 μm), the partition member 1, an aluminum foil 33 (thickness 11 μm), an aluminum plate 31, a buffer 32B (same material as that of the buffer 32A), an aluminum plate 31 and a heat sink 34A (comb-type heat sink, made of aluminum, 120 mm×120 mm×30 mm), in that order, and the various members were bonded. As illustrated in FIG. 13A and FIG. 13B, a 50 mm portion of the same partition member, on the right side, was sandwiched between a heat sink 34B and a heat sink 34C made of aluminum (plate-shaped heat sinks, 170 mm×100 mm×15 mm).

The heater 30 corresponds to a single cell, or part of a single cell, having become abnormally heated due to, for instance, a micro short-circuit in a single cell 2 and/or generation of heat in a terminal portion (terminal 21, terminal 22), in an assembled battery. The heat sinks 34A, 34B and 34C each correspond to a single cell or part of a single cell, at a temperature lower than that of abnormal heat generation or at normal temperature, or to a single cell or part of a single cell receiving heat from an abnormally heated single cell or part of a single cell, or to a member other than the single cells that make up the assembled battery. The aluminum plate 31 and the aluminum foil 33, which have higher thermal conductivity than that of the members that make up the single cells 2, are disposed on respective planes in order to measure in a timely fashion the surface temperature of surfaces at which the heater 30, the filter paper 11 and the heat sink 34A oppose each other. The buffer 32A and 32B are disposed between respective surfaces in order to suppress conduction of heat to opposing surfaces, and measure individually the temperatures of surfaces at which the heater 30, the filter paper 11 and the heat sink 34A oppose each other.

Figure 14:
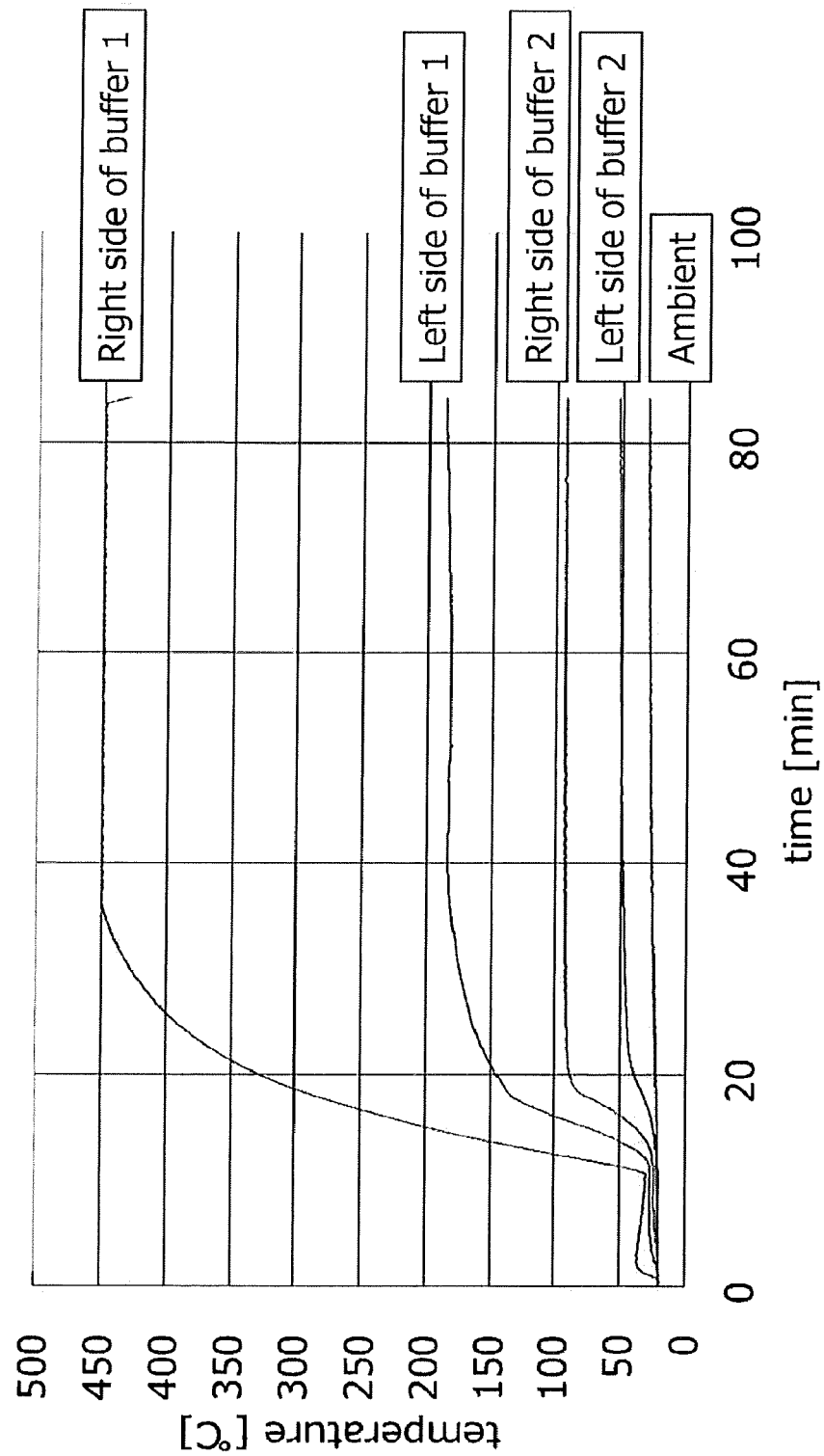
FIG. 14 is a graph illustrating the evolution of temperature at a high-temperature side and a low-temperature side of the partition member of Example 1.

In this state, the whole was allowed to stand at room temperature in the atmosphere, the heater 30 was heated up to a temperature of 450° C., and once the temperature of the heater 30 had reached 450° C., heating was thereafter continued for 1 hour. The evolution of temperature at respective positions was measured from start of heating of the heater 30 until heating was over. The results are illustrated in FIG. 14.

On the basis of the temperature difference between the high-temperature side and the low-temperature side of the buffer 32A and buffer 32B (zirconia-made plates) disposed on the left and right of the partition member 1, and on the basis of the thermal conductivity of the zirconia-made plates, there was worked out the rate of heat flowing into each zirconia-made plate. Respective values of heat flow rate from the heater 30 to the partition member, heat flow rate from the partition member 1 to the heat sink 34A, and heat flow rate from the heater 30 to the heat sink 34B and the heat sink 34C via the partition member, were worked out on the basis of the expressions below.

$$Q_1 = A_1 \times k_1 \times \Delta T_1 / L_1$$

$$Q_2 = A_2 \times k_2 \times \Delta T_2 / L_2$$

$$Q_3 = Q_1 - Q_2$$

$Q_1$: heat flow rate [W] from the heater 30 to the partition member 1

$Q_2$: heat flow rate [W] from the partition member 1 to the heat sink 34A

$Q_3$: total [W] of heat flow rates from the heater 30 to the heat sink 34B and the heat sink 34C via the partition member $A_1$: projected area 0.0025 [m$^2$] of the buffer 32A in a direction from the heater 30 to the heat sink 34A

$A_2$: projected area 0.0025 [m$^2$] of the buffer 32B in a direction from the heater 30 to the heat sink 34A.

$k_1$: thermal conductivity 0.93 [W/(m K)] of the buffer 32A

$k_2$: thermal conductivity 0.93 [W/(m K)] of the buffer 32B

$\Delta T_1$: temperature difference [K] between the high-temperature-side surface and the low-temperature-side surface of the buffer 32A

$\Delta T_2$: temperature difference [K] between the high-temperature-side surface and the low-temperature-side surface of the buffer 32B

$L_1$: thickness 0.005 [m] of the buffer 32A

$L_2$: thickness 0.005 [m] of the buffer 32B

The heat flow rate after 10 minutes since the heater 30 had reached 450° C. was as follows.

Heat flow rate from the heater 30 to the partition member: 124 W

Heat flow rate from the partition member 1 to the heat sink 34A: 20 W

Heat flow rates (total) from the partition member 1 to the heat sink 34B and the heat sink 34C: 104 W The temperature on the low temperature side of the partition member 1 was maintained below 100° C. until heating by the heater 30 was over. Specifically, it was found that from among the quantity of heat generated by the heater 30 the heat flow rate to the heat sink 34B and the heat sink 34C along the surface direction of the partition member 1 was higher than the heat flow rate to the heat sink 34A along the thickness direction of the partition member 1.

Comparative Example 1

Figure 15:
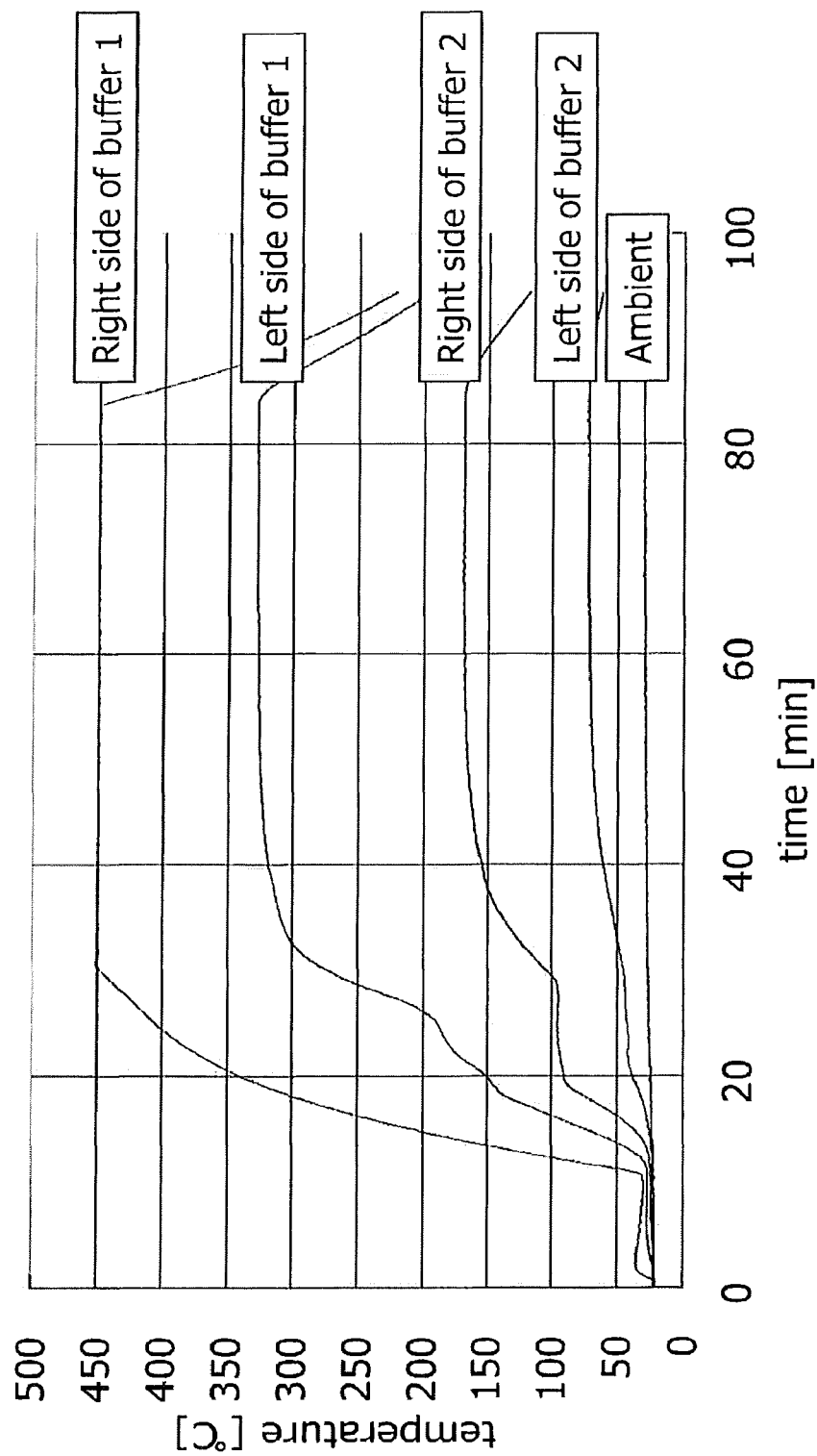
FIG. 15 is a graph illustrating the evolution of temperature at a high-temperature side and a low-temperature side of a partition member of Comparative example 1.

The same experiment as in Example 1 was carried out under a condition whereby no flow channel 12 was formed in the filter paper 11. FIG. 15 illustrates the evolution of the actually measured temperature.

The heat flow rate after 10 minutes since the heater 30 had reached 450° C. was as follows.

Heat flow rate from the heater 30 to the partition member 1: 61 W

Heat flow rate from the partition member 1 to the heat sink 34A: 43 W

Heat flow rates (total) from the partition member 1 to the heat sink 34B and the heat sink 34C: 17 W The temperature of the low temperature side of the partition member 1 reached 150° C. after 7 minutes and 40 seconds since the temperature of the heater 30 had reached 450° C. Specifically, it was found that from among the quantity of heat generated by the heater 30 the heat flow rate to the heat sink 34A along the thickness direction of the partition member 1 was higher than the heat flow rate to the heat sink 34B and the heat sink 34C along the surface direction of the partition member 1.

Comparative Example 2

Figure 16:
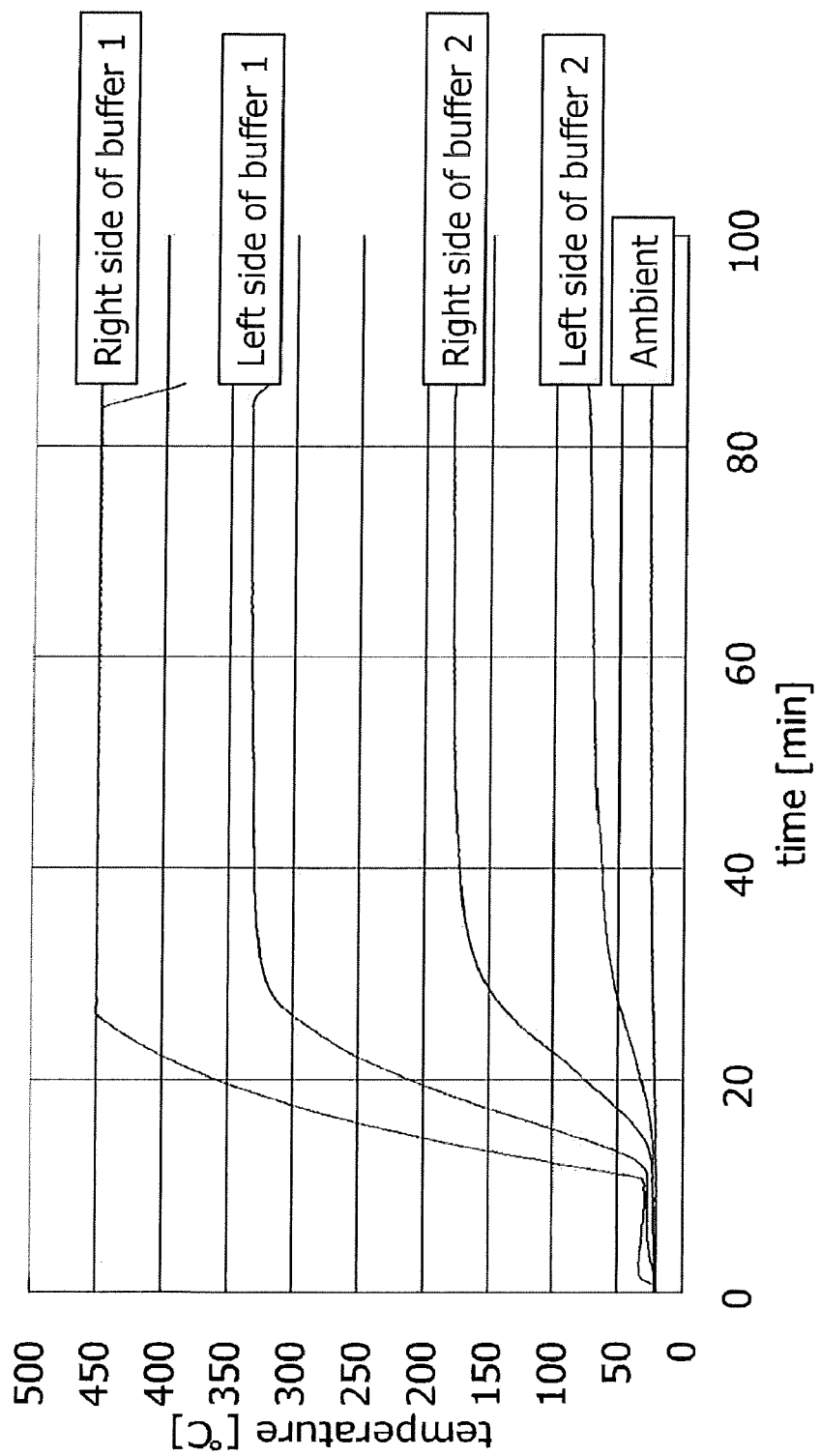
FIG. 16 is a graph illustrating the evolution of temperature at a high-temperature side and a low-temperature side of a partition member of Comparative example 2.

The same experiment as in Example 1 was carried out under a condition whereby the flow channel 12 was not formed in the filter paper 11, and the filter paper 11 was not impregnated with water. FIG. 16 illustrates the evolution of the actually measured temperature.

The heat flow rate after 10 minutes since the heater 30 had reached 450° C. was as follows.

Heat flow rate from the heater 30 to the partition member 1: 56 W

Heat flow rate from the partition member 1 to the heat sink 34A: 50 W

Heat flow rates (total) from the partition member 1 to the heat sink 34B and the heat sink 34C: 6 W The temperature of the low temperature side of the partition member 1 reached 150° C. after 2 minutes and 40 seconds since the temperature of the heater 30 had reached 450° C.

Example 2

Figure 17:
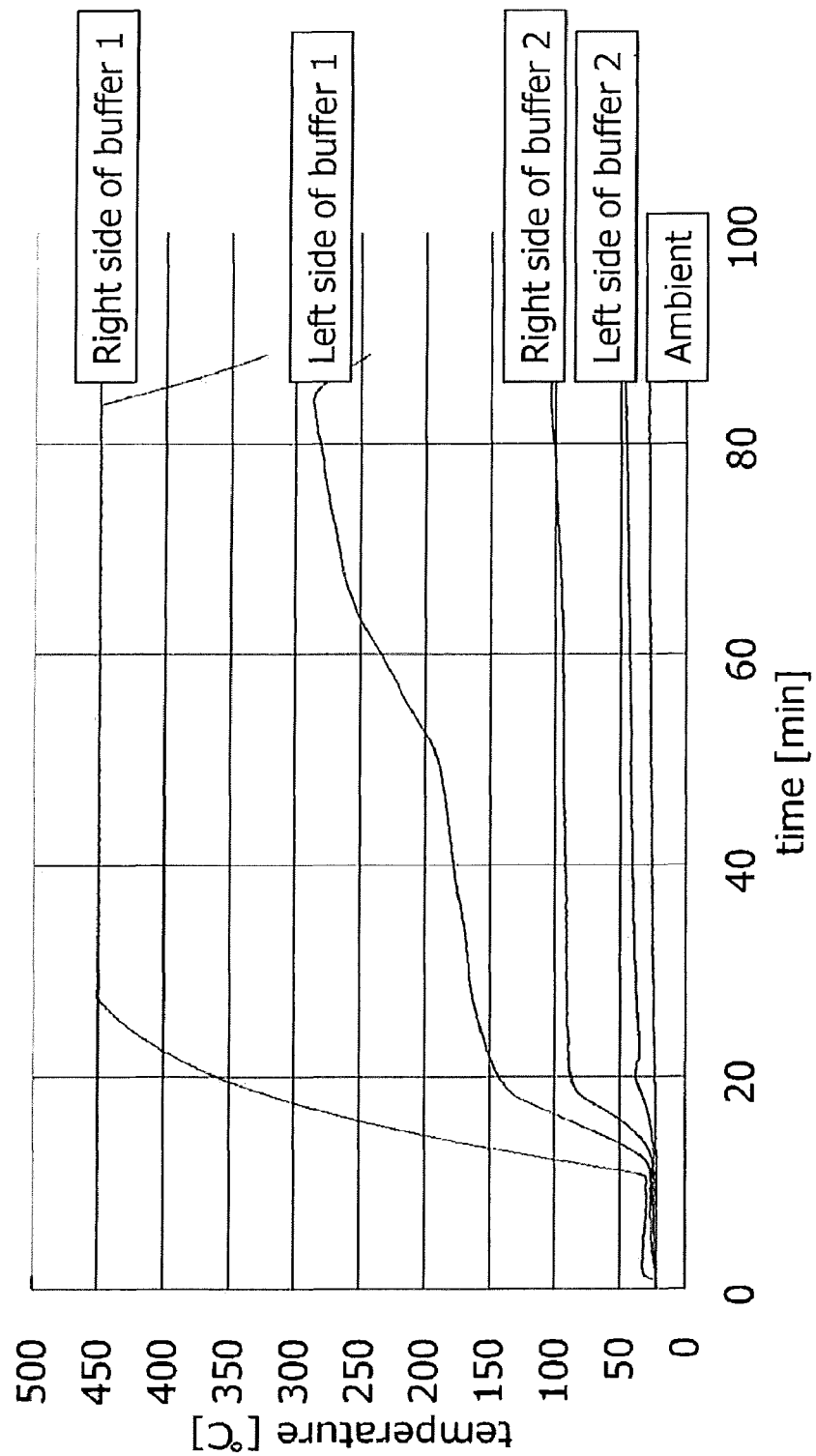
FIG. 17 is a graph illustrating the evolution of temperature at a high-temperature side and a low-temperature side of a partition member of Example 2.

Experiment 1: the same experiment as in Example 1 was carried out but using herein, as the filter paper, two glass fiber sheet sheets (model number: GA-100) having a thickness of 0.44 mm, by Advantec Toyo Kaisha, Ltd., overlaid on each other, and in which the width of the flow channel 12 was set to 2 mm. FIG. 17 illustrates the evolution of the actually measured temperature.

The heat flow rate after 10 minutes since the heater 30 had reached 450° C. was as follows.

Heat flow rate from the heater 30 to the partition member 1: 128 W

Heat flow rate from the partition member 1 to the heat sink 34A: 24 W

Heat flow rates (total) from the partition member 1 to the heat sink 34B and the heat sink 34C: 104 W The temperature on the low temperature side of the partition member 1 was maintained at about 100° C. until heating by the heater 30 was over.

Example 3

Figure 18:
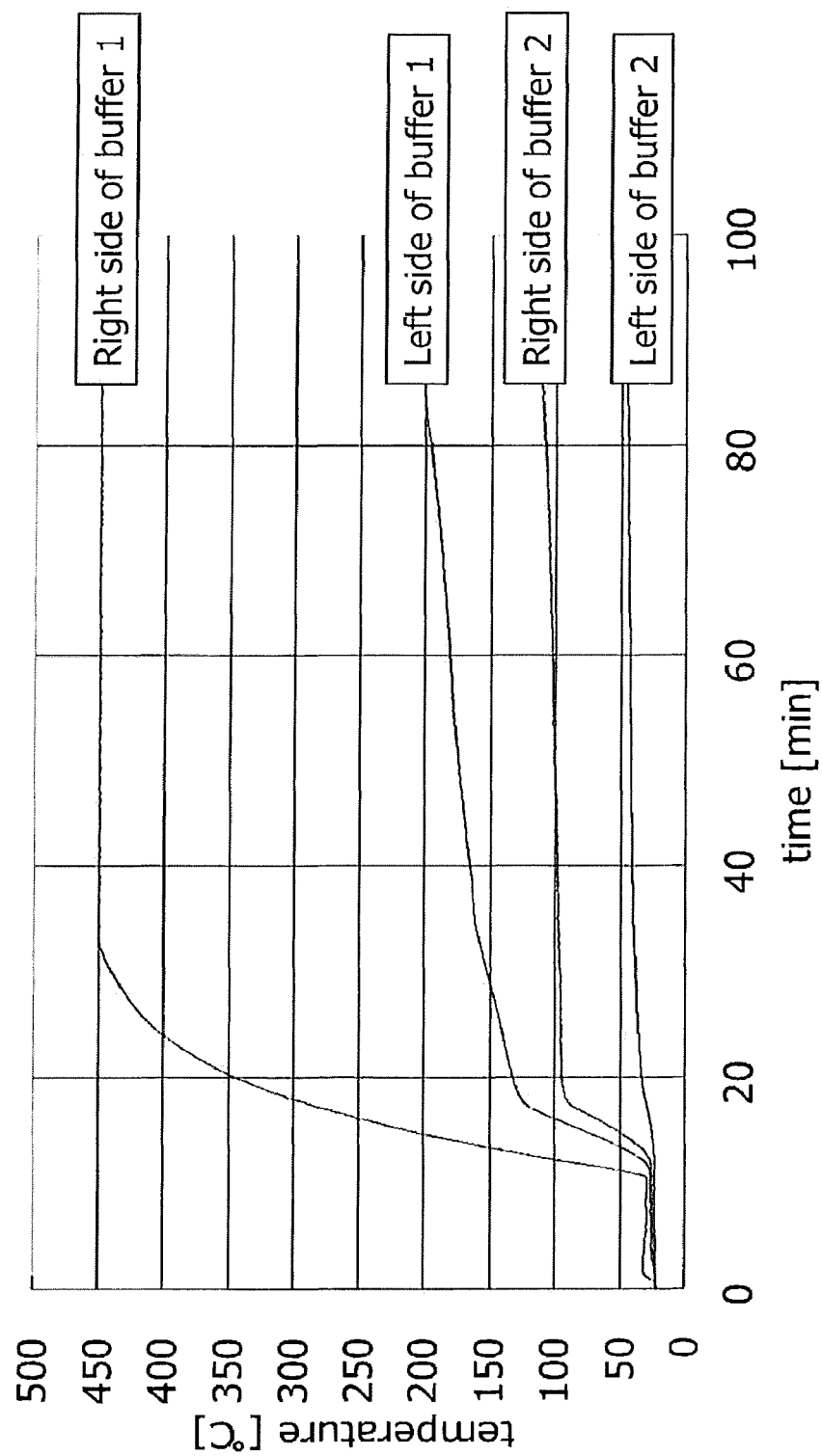
FIG. 18 is a graph illustrating the evolution of temperature at a high-temperature side and a low-temperature side of a partition member of Example 3.

Experiment 1: the same experiment as in Example 1 was carried out but using herein a ceramic fiber sheet (model number: Fineflex Paper TOMBO 5130-T) by NICHIAS Corporation as the filter paper 11, and using an aluminum laminate PET sheet (model number: D-EL40H-200), by Dai Nippon Printing Ltd., as the sheet 13 made of PET. FIG. 18 illustrates the evolution of the actually measured temperature.

The heat flow rate after 10 minutes since the heater 30 had reached 450° C. was as follows.

Heat flow rate from the heater 30 to the partition member 1: 131 W

Heat flow rate from the partition member 1 to the heat sink 34A: 27 W

Heat flow rates (total) from the partition member 1 to the heat sink 34B and the heat sink 34C: 104 W The temperature on the low temperature side of the partition member 1 was kept below 120° C. until heating by the heater 30 was over.

REFERENCE SIGNS LIST

According to a partition member and an assembled battery of the embodiments, in a case where a single cell that makes up the assembled battery becomes abnormally heated, it is able to promote safe cooling of an abnormally heated portion, without allowing that cells in the periphery of the abnormally heated portion should reach thermal runaway.

What is claimed is:

1. A partition member which has a thickness direction and a surface direction perpendicular to the thickness direction, and which separates single cells that make up an assembled battery in the thickness direction, or a single cell that makes up the assembled battery in the thickness direction and a member other than the single cells, the partition member comprising:
   in the interior thereof, a fluid having a boiling point at normal pressure of 80° C. to 250° C.; and
   a flow channel of the fluid extending along the surface direction,
   wherein the fluid is held in a fluid holding part, and the fluid holding part is hermetically sealed by a packaging material,
   wherein the flow channel includes a plurality of flow channel segments in fluid communication,
   wherein the plurality of flow channel segments include flow channel segments that extend in a height direction of the fluid holding part and flow channel segments that extend in a width direction of the fluid holding part, and
   wherein the flow channel has a meander shape.

2. The partition member according to claim 1,
   wherein the flow channel includes a continuous space through which the fluid is capable of moving and which has a length of 1 mm or greater, and the space is a space in which a sphere capable of being inscribed in a region of the space has a diameter of 0.1 mm or greater, the region taking up 90% or more of the volume of the space.

3. The partition member according to claim 1,
   wherein the fluid contains at least one selected from the group consisting of water, alcohols, esters, ethers, ketones, hydrocarbons, fluorine-based compounds and silicone-based oils.

4. The partition member according to claim 1,
   wherein a porous body containing the fluid is provided in the interior of the partition member, and
   the flow channel is formed in the porous body.

5. The partition member according to claim 4,
   wherein the porous body contains at least one from among a fibrous layer and a particle layer.

6. The partition member according to claim 5,
   wherein the porous body contains a fibrous layer, and is at least one selected from a group consisting of a glass fiber sheet, a ceramic fiber sheet, paper, a cotton sheet, a porous ceramic plate, a porous glass plate, a polyimide fiber sheet, an aramid fiber sheet and a polytetrafluoroethylene fiber sheet.

7. The partition member according to claim 5,
   wherein the porous body contains a particle layer, and is at least one selected from a group consisting of silica particles, alumina particles, zeolite particles, glass particles and carbon particles.

8. The partition member according to claim 4, comprising the packaging material that encloses the porous body.

9. The partition member according to claim 1,
   wherein the length of the flow channel in a height direction or a width direction of the partition member is a half or more of the length of the partition member in the height direction or the width direction.

10. An assembled battery, comprising the partition member according to claim 1.

11. The assembled battery according to claim 10,
    wherein the surface direction of the partition member includes a width direction of the partition member;
    and the length of the partition member in the width direction is greater than the length of single cells, which are separated by the partition member, in the width direction.

12. The assembled battery according to claim 10, wherein one of two thickness-direction surfaces of the partition member has a first region opposing a first single cell in the assembled battery and a second region not opposing the first single cell, and, in the second region, opposes at least one from among a second single cell in the assembled battery different from the first single cell, and a member other than the single cells.

13. The assembled battery according to claim 12,
wherein the other of the two thickness-direction surfaces of the partition member opposes at least one from among a third single cell and a member other than the single cells in the assembled battery, the third single cell being different from the first single cell and the second single cell, and present at a position not opposing the first single cell across the partition member.

14. The assembled battery according to claim 10,
wherein one of the two thickness-direction surfaces of the partition member opposes a first single cell among a plurality of single cells included in the assembled battery, and the other of the two thickness-direction surfaces opposes at least one from among a single cell in the assembled battery and a member other than the single cells in the assembled battery, the single cell being different from the first single cell, and present at a position not opposing the first single cell across the partition member.

15. The partition member according to claim 1, wherein each of the plurality of flow channel segments is formed along a linear path.

16. The assembled battery according to claim 15, wherein a length of the flow channel segments extending in the width direction is less than a length of the fluid holding part in the width direction.

17. The partition member according to claim 1, wherein the flow channel is filled 100% with fluid.

18. The partition member according to claim 1, wherein the packaging material includes an opening, and the opening is opened at temperatures of a melting point of a liquid or more.

19. The partition member according to claim 1, wherein the flow channel is a consecutive channel of first flow channel segments extending in a height direction of the partition member and second flow channel segments extending in a width direction of the partition member, and a total length of the first flow channel segments and the second flow channel segments is longer than a sum of the height direction and the width direction of the partition member.

20. A partition member which has a thickness direction and a surface direction perpendicular to the thickness direction, and which separates single cells that make up an assembled battery in the thickness direction, or a single cell that makes up the assembled battery in the thickness direction and a member other than the single cells, the partition member comprising:
in the interior thereof, a fluid holding part capable of holding a fluid having a boiling point at normal pressure of 80° C. to 250° C.; and
a flow channel of the fluid extending along the surface direction,
wherein the fluid holding part is hermetically sealed by a packaging material,
wherein the flow channel includes a plurality of flow channel segments in fluid communication,
wherein the plurality of flow channel segments include flow channel segments that extend in a height direction of the fluid holding part and flow channel segments that extend in a width direction of the fluid holding part, and
wherein the flow channel has a meander shape.

* * * * *